United States Patent
Kokeguchi et al.

(10) Patent No.: US 7,619,803 B2
(45) Date of Patent: Nov. 17, 2009

(54) ELECTROCHROMIC DISPLAY ELEMENT AND FULL-COLOR ELECTROCHROMIC DISPLAY ELEMENT

(75) Inventors: Noriyuki Kokeguchi, Kokubunji (JP); Osamu Ishige, Kawasaki (JP); Rie Sakuragi, Ebina (JP)

(73) Assignee: Konica Minolta Holdings, Inc., Tokyo (JP)

( * ) Notice: Subject to any disclaimer, the term of this patent is extended or adjusted under 35 U.S.C. 154(b) by 153 days.

(21) Appl. No.: 11/915,729

(22) PCT Filed: Apr. 11, 2006

(86) PCT No.: PCT/JP2006/307606

§ 371 (c)(1),
(2), (4) Date: Nov. 27, 2007

(87) PCT Pub. No.: WO2006/129424

PCT Pub. Date: Dec. 7, 2006

(65) Prior Publication Data

US 2009/0027757 A1    Jan. 29, 2009

(30) Foreign Application Priority Data

May 31, 2005   (JP) ............................. 2005-158888

(51) Int. Cl.
*G02F 1/15*   (2006.01)
*G02B 5/23*   (2006.01)
(52) U.S. Cl. .................. 359/265; 359/269; 359/275; 252/586
(58) Field of Classification Search ......... 359/265–275; 252/582, 583, 586
See application file for complete search history.

(56) References Cited

U.S. PATENT DOCUMENTS

| 4,795,242 A | * | 1/1989 | Wudl et al. ................. 359/265 |
| 5,294,376 A | * | 3/1994 | Byker ........................ 252/600 |
| 6,120,696 A | * | 9/2000 | Armand et al. ............ 252/62.2 |

(Continued)

FOREIGN PATENT DOCUMENTS

| JP | 2004-151265 | 5/2004 |
| WO | WO 03/001288 | 1/2003 |

*Primary Examiner*—Evelyn A. Lester
(74) *Attorney, Agent, or Firm*—Finnegan, Henderson, Farabow, Garrett & Dunner, L.L.P.

(57) ABSTRACT

An electrochromic display element includes a pair of counter electrodes having therebetween an electrochromic compound represented by Formula (1), wherein the electrochromic compound becomes colored when being oxidized and becomes colorless when being reduced by a driving operation of the electrodes:

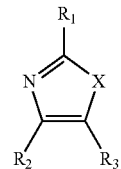

Formula (1)

wherein $R_1$ represents a substituted or unsubstituted aryl group; and $R_2$ and $R_3$ each represent a hydrogen atom or a substituent; X represents $>N-R_4$, an oxygen atom or a sulfur atom; and $R_4$ represents a hydrogen atom or a substituent.

11 Claims, 1 Drawing Sheet

U.S. PATENT DOCUMENTS

| | | | |
|---|---|---|---|
| 6,171,522 B1 * | 1/2001 | Michot et al. | 252/500 |
| 6,365,068 B1 * | 4/2002 | Michot et al. | 252/500 |
| 7,471,437 B2 * | 12/2008 | Lenhard et al. | 359/265 |
| 7,505,191 B2 * | 3/2009 | Liu et al. | 359/273 |
| 2003/0206326 A1 * | 11/2003 | Berneth et al. | 359/265 |
| 2005/0200935 A1 * | 9/2005 | Liu et al. | 359/265 |
| 2006/0103911 A1 * | 5/2006 | Baumann et al. | 359/265 |

* cited by examiner

ELECTROCHROMIC DISPLAY ELEMENT AND FULL-COLOR ELECTROCHROMIC DISPLAY ELEMENT

TECHNICAL FIELD

The present invention relates to an electrochromic display element exhibiting significantly improved memory capability, and a full-color electrochromic display element that is capable of easily realizing full colorization and exhibits significantly improved memory capability.

BACKGROUND OF THE ART

In recent years, in association with enhancement of operation speed of personal computers, widespread use of network infrastructure, and realization of mass storage of data, as well as cost reduction of data storage, there are increasing occasions in which information of documents and images, having been conventionally provided in the form of paper printed matter, is received and viewed as more convenient electronic information.

As viewing methods for these items of electronic information, mainly utilized are conventional types such as liquid crystal display devices and CRTs. In recent years, light emitting types such as organic EL display devices have been used. Specifically, however, when electronic information is composed of pieces of document information, it is necessary to stare at these viewing devices for a relatively long time, which is certainly not viewer-friendly. It is commonly known that light emitting type display devices have disadvantages such as eye fatigue due to flicker, inconvenience of portability, limited reading posture, necessity to look directly at still images, and high power consumption due to the use of these devices for long-time reading.

As display devices to overcome these disadvantages, there are known memory-type reflective display devices, which utilize external light, resulting in consuming no electrical power to retain images. However, these devices do not exhibit adequate performance due to the following reasons.

Namely, a system, employing a polarizing plate such as a reflective type liquid crystal, creates a problem in white display due to its low reflectance of approximately 40%, and most production methods of constituent members are neither simple nor easy. Further, polymer dispersion type liquid crystals require high operating voltage and exhibit poor contrast of resultant images due to the image formation manner based on the refractive index difference between the used organic compounds. Still further, polymer network type liquid crystals result in problems such as high operating voltage and require complicated TFT circuits to enhance memory capability. Yet further, display elements using electrophoresis require a high operating voltage of at least 10 V and tend to exhibit low operation life due to electrophoretic particle aggregation.

In contrast, although being drivable at a low voltage of at most 3 V, electrochromic display elements have the disadvantage of exhibiting poor color quality (for black and the colors, namely yellow, magenta, cyan, blue, green and red), as well as having the disadvantage that each display cell requires a complicated film structure such as a vapor deposition film to ensure memory capability.

As a display system to overcome any of the problems in these electrochromic display systems, an electrochromic device, featuring a full-color display of a simple structure, bright and easily viewable, and low-power consumption, has been disclosed, wherein, for example, there is employed an electrochromic element, incorporating an electrolyte layer, being arranged between two conductive substrates, one of which is transparent, wherein the electrolyte layer contains an electrochromic dye which is colored and reversibly rendered colorless via at least one of oxidation and reduction (refer, for example, to Patent Document 1). Patent Document 1 discloses styryl dyes, leuco based dyes, viologens, and phenothiazines as specific examples of the electrochromic dye, but there are no descriptions or implications of imidazole leuco dyes.

Further, there has been disclosed a high resolution electrochromic element, incorporating a substrate and an electrochromic material applied to the substrate in a spatially resolved manner, wherein the electrochromic material exhibits a resolution of at least 75 dpi roughly (refer, for example, to Patent Document 2). Patent Document 2 discloses viologens containing phosphonoethyl groups as specific examples of the electrochromic dye, as well as a structure to incorporate porous electrodes as the electrochromic element, but there are no descriptions or implications of imidazole leuco dyes.

Still further, any of the electrochromic dyes described in Patent Documents 1 and 2 are radical cation type dyes, in which color is produced via reduction. The inventors of the present invention conducted detailed investigation and found that it was necessary to maintain adequate structural stability when employing these radical cation type dyes, resulting in an essential difficulty to ensure memory capability. In addition, it was found that a full-color image via these dyes, exhibited poor color image quality.

Patent Document 1: Japanese Patent Publication Open to Public Inspection No. 2004-151265

Patent Document 2: Japanese Translation of PCT International Application No. 2004-537743

DISCLOSURE OF THE INVENTION

Problems to be Solved by the Invention

In view of the foregoing, the present invention was realized. An object of the present invention is to provide an electrochromic display element exhibiting significantly improved memory capability, and a full-color electrochromic display element that is capable of easily realizing full colorization, as well as exhibiting significantly improved memory capability.

Means to Solve the Problems

The object of the present invention was achieved employing the following embodiments.

1. An electrochromic display element characterized by incorporating an electrochromic compound represented by Formula (1), between a pair of counter electrodes, which are subjected to driving operation so that the electrochromic compound is colored via oxidation and rendered colorless via reduction.

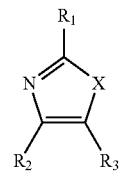

Formula (1)

(wherein $R_1$ represents a substituted or unsubstituted aryl group, and $R_2$ and $R_3$ each represent a hydrogen atom or a substituent. X represents >N—$R_4$, an oxygen atom or a sulfur atom, and $R_4$ represents a hydrogen atom or a substituent.)
2. The electrochromic display element, described in 1., wherein X in Formula (1) is >N—$R_4$.
3. The electrochromic display element, described in 1. or 2., wherein $R_1$ in Formula (1) is a substituted or unsubstituted phenyl group.
4. The electrochromic display element, described in 1. or 2., wherein $R_1$ in Formula (1) is a substituted or unsubstituted 2-hydroxyphenyl or 4-hydroxyphenyl group.
5. The electrochromic display element, described in any one of 1.-4., wherein either of $R_2$ and $R_3$ in Formula (1) is a substituted or unsubstituted aryl group.
6. The electrochromic display element, described in any one of 1.-4., wherein $R_2$ and $R_3$ in Formula (1) are a substituted or unsubstituted aryl group.
7. The electrochromic display element, described in any one of 1.-6., wherein the electrochromic compound, represented by Formula (1), contains a phosphono group.
8. The electrochromic display element, described in any one of 1.-7., wherein at least one of the counter electrodes incorporates a layer formed by bonding of transparent conductive microparticles.
9. The electrochromic display element, described in any one of 1.-8., wherein a porous white scattering layer is arranged between the counter electrodes.
10. The electrochromic display element, described in any one of 1.-9., wherein the driving operation for the counter electrodes is an active matrix drive.
11. A full-color electrochromic display element characterized by incorporating, between counter electrodes, a plurality of electrochromic compounds, represented by Formula (1), which are colored in a specific color tone, wherein the counter electrodes are subjected to driving operation so that the electrochromic compounds are colored via oxidation and rendered colorless via reduction.

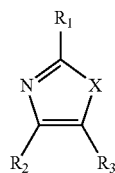

Formula (1)

(wherein $R_1$ represents a substituted or unsubstituted aryl group, and $R_2$ and $R_3$ each represent a hydrogen atom or a substituent. X represents >N—$R_4$, an oxygen atom or a sulfur atom, and $R_4$ represents a hydrogen atom or a substituent.)

EFFECTS OF THE INVENTION

According to the present invention, it is possible to provide an electrochromic display element exhibiting significantly improved memory capability, and a full-color electrochromic display element that is capable of easily realizing full colorization, as well as exhibiting significantly improved memory capability.

Figure 1:
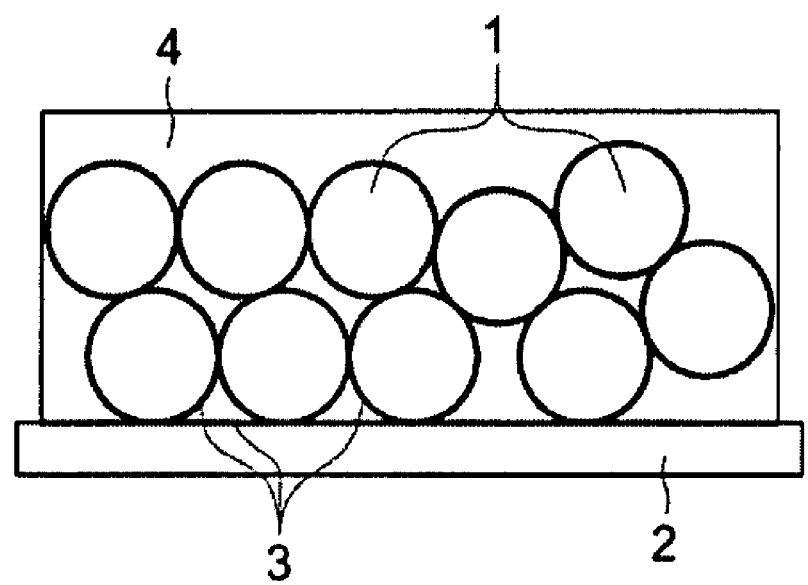
FIG. 1 is a schematic view showing one example of the porous electrode of the present invention.

DESCRIPTION OF THE NUMERIC DESIGNATIONS 1 microparticles
2 electrode substrate
3 transparent conductive film
4 electrolyte

BEST MODE FOR CARRYING OUT THE INVENTION

Preferred embodiments to achieve the present invention will now be detailed.

In view of the above problems, the inventors of the present invention conducted diligent investigation and achieved the present invention by discovering the following. An electrochromic display element, exhibiting significantly improved memory capability, was realized employing an electrochromic display element characterized by incorporating an electrochromic compound, represented by Formula (1), between counter electrodes, which were subjected to driving operation so that the electrochromic compound was colored via oxidation and rendered colorless via reduction, and further, a full-color electrochromic display element, which easily realized full colorization and exhibited significantly improved memory capability, was realized employing a full-color electrochromic display element containing a plurality of electrochromic display elements each characterized by incorporating, between the counter electrodes, a plurality of electrochromic compounds represented by Formula (1), which were colored in a specific color tone, wherein the counter electrodes were subjected to driving operation so that the electrochromic compounds were colored via oxidation and rendered colorless via reduction.

Herein, the term "being colored" used in the present invention refers to a state wherein the maximum absorption range of the electrochromic compound represented by Formula (1) falls within the human visible wavelength range (400 μm-700 μm), whereby the color of the electrochromic display element is visible, and in contrast, the term "being colorless" refers to a state wherein substantially no maximum absorption range is present in the visible range, resulting in that the color of the electrochromic display element is not visible.

The electrochromic display element and the full-color electrochromic display element of the present invention will now be detailed.

The electrochromic display element and the full-color electrochromic display element (hereinafter both are also referred to simply as the display element) of the present invention incorporate the electrochromic compounds represented by Formula (1), between the counter electrodes, which are subjected to driving operation so that the electrochromic compounds are colored via oxidation and rendered colorless via reduction.

<Compounds Represented by Formula (1)>

Initially, the electrochromic compounds represented by Formula (1) of the present invention are described.

In Formula (1), $R_1$ represents a substituted or unsubstituted aryl group, and $R_2$ and $R_3$ each represent a hydrogen atom or a substituent. Specific examples of the substituents represented by $R_1$, $R_2$ and $R_3$ include an alkyl group (for example, a methyl group, an ethyl group, a propyl group, an isopropyl group, a tert-butyl group, a pentyl group, or a hexyl group), a cycloalkyl group (for example, a cyclohexyl or a cyclopentyl group), an alkenyl group, a cycloalkenyl group, an alkynyl group (for example, a propargyl group), a glycidyl group, an acrylate group, a methacrylate group, an aromatic group (for example, a phenyl group, a naphthyl group, or an anthracenyl group), a heterocyclic group (for example, a pyridyl group, a thiazolyl group, an oxazolyl group, an imidazolyl group, a furyl group, a pyrrolyl group, a pyrazinyl group, a pyrimidinyl group, a pyridazinyl group, a selenazolyl group, a sulfolanyl group, a piperidinyl group, a pyrazolyl group, or a tetrazolyl group), an alkoxy group (for example, a methoxy group, an ethoxy group, a propyloxy group, a pentyloxy group, a cyclopentyloxy group, a hexyloxy group, or a cyclohexyloxy group), an aryloxy group (for example, a phenoxy group), an alkoxylcarbonyl group (for example, a methyloxycarbonyl group, an ethyloxycarbonyl group, or a butyloxycarbonyl group), an aryloxycarbonyl group (for example, a phenyloxycarbonyl group), a sulfonamide group (for example, a methane sulfonamide group, an ethane sulfonamide group, or a butane sulfonamide group, a hexane sulfonamide group, a cyclohexane sulfonamide group, or a benzene sulfonamide group), a sulfamoyl group (for example, an aminosulfonyl group, a methylaminosulfonyl group, a dimethylaminosulfonyl group, a butylaminosulfonyl group, a hexylaminosulfonyl group, a cyclohexylaminosulfonyl group, a phenylaminosulfonyl group, or a 2-pyridylaminosulfonyl group), an urethane group (for example, a methylureide group, an ethylureide group, a pentylureide group, a cyclohexylureide group, a phenylureide, or a 2-pyridylureide), an acyl group (for example, an acetyl group, a propionyl group, a butanoyl group, a hexanoyl group, a cyclohexanoyl group, a benzoyl group, or a pyridinoyl group), a carbamoyl group (for example, an aminocarbamoyl group, a methylaminocarbamoyl group, a dimethylaminocarbamoyl group, a propylaminocarbamoyl group, a pentylaminocarbamoyl group, a cyclohexylaminocarbamoyl group, a phenylaminocarbamoyl group, or 2-pyridylaminocarbamoyl group), an acylamino group (for example, an acetylamino group, a benzoylamino group, or a methylureide group), an amide group (for example, an acetamide group, a propionamide group, a butanamide, a hexanamide, or a benzamide group), a sulfonyl group (for example, a methylsulfonyl group, an ethylsulfonyl group, a butylsulfonyl group, a cyclohexylsulfonyl group a phenylsulfonyl group, or a 2-pyridylsulfonyl group), a sulfonamide (for example, a methylsulfonamide group, an octylsulfonamide group, a phenylsulfonamide group, or a naphthylsulfonamide group), an amino group (for example, an amino group, an ethylamino group, a dimethylamino group, a butylamino group, a cyclopentylamino group, an anilino group, or a 2-pyridylamino group), a halogen atom (for example, a chlorine atom, a bromine atom, a iodine atom), a cyano group, a nitro group, a sulfo group, a carboxyl group, a hydroxyl group, a phosphono group (for example, a phosphonoethyl group, a phosphonopropyl group, or a phosphonooxyethyl group), or an oxamoyl group. These substituents may be further substituted by any of them.

$R_1$ is a substituted or unsubstituted aryl group, but is preferably a substituted or unsubstituted phenyl group, more preferably a substituted or unsubstituted 2-hydroxyphenyl or 4-hydroxyphenyl groups.

$R_2$ and $R_3$ are preferably an alkyl group, a cycloalkyl group, an aromatic group, or a heterocyclic group; more preferably, one of $R_2$ and $R_3$ is a phenyl group, and the other is an alkyl group; and further more preferably, both of $R_2$ and $R_3$ are a phenyl group.

X is preferably >N—$R_4$. $R_4$ is preferably a hydrogen atom, an alkyl group, an aromatic group, a heterocyclic group, or an acyl group, but is more preferably a hydrogen atom, an alkyl group having 1-10 carbon atoms, an aryl group having 5-10 carbon atoms, or an acyl group.

Specific examples of the electrochromic compounds of the present invention will now be listed; however, the present invention is not limited only to the following example compounds.

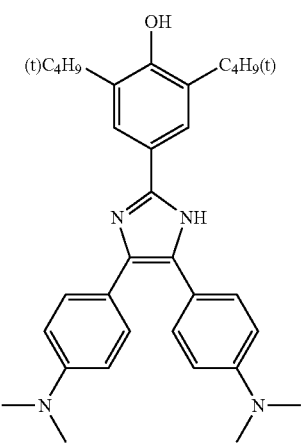

1

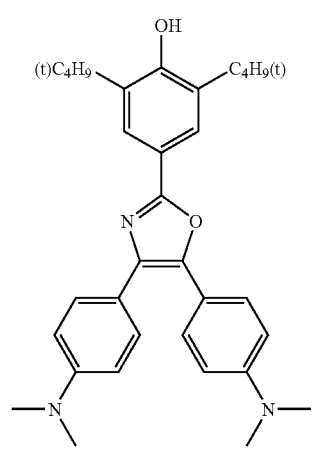

2

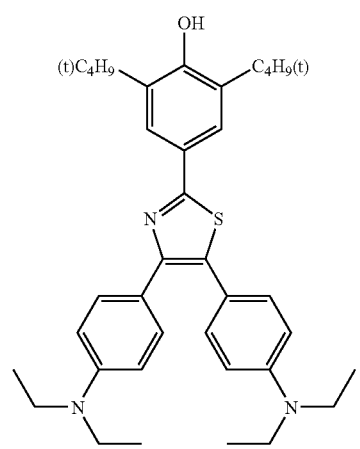

3

4
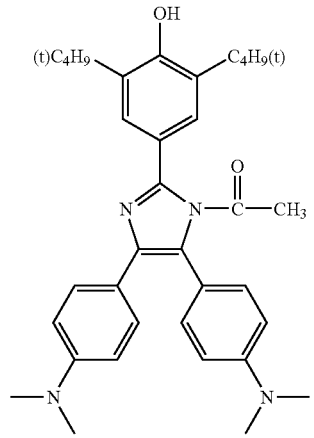
5
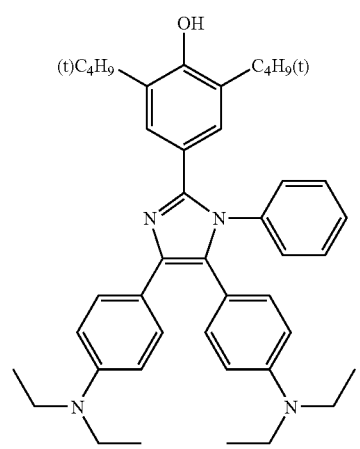
6
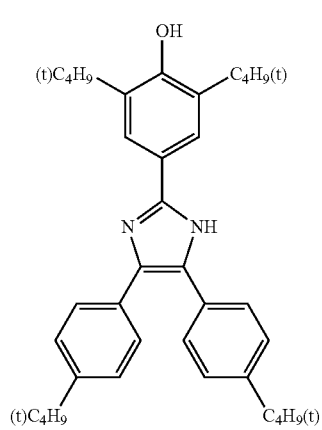
7
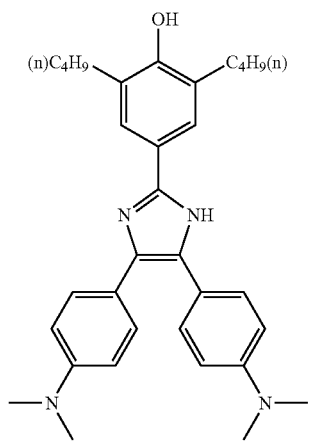
8
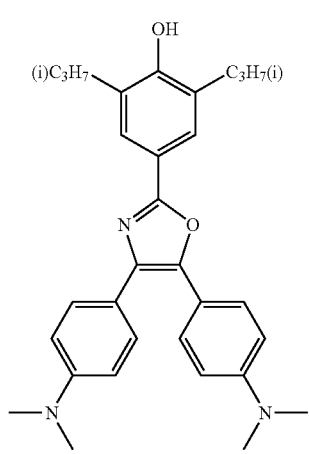
9
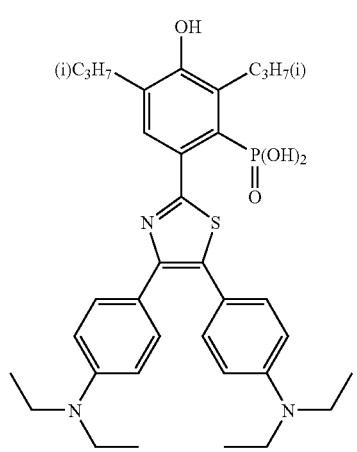

9
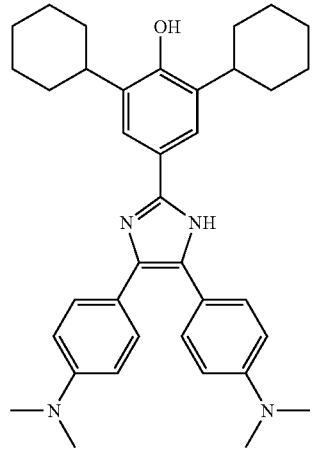
10
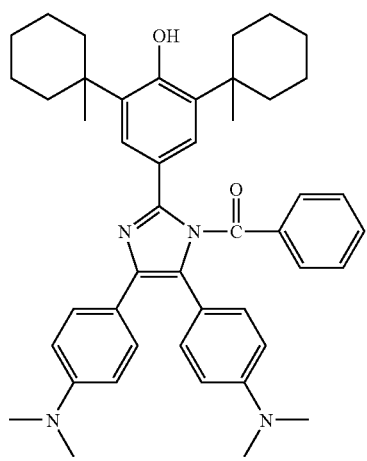
11
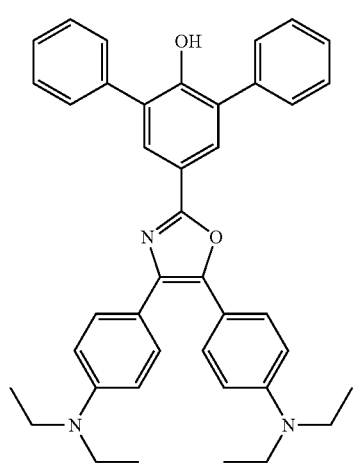
12
10
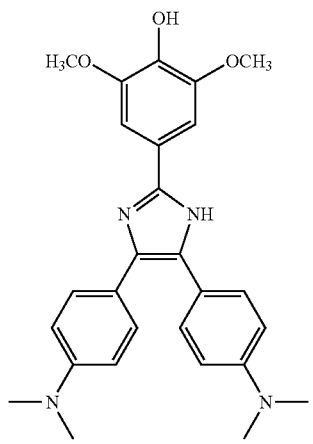
13
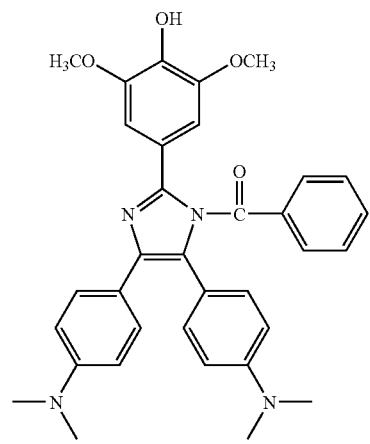
14
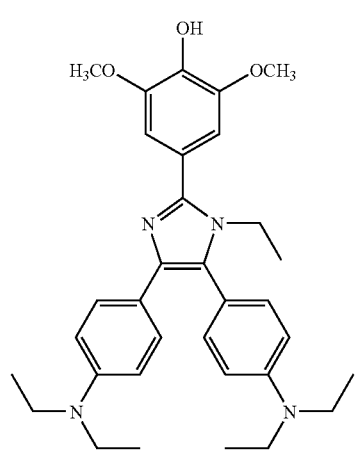
15

16
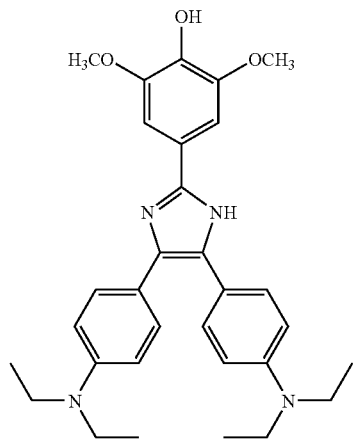
17
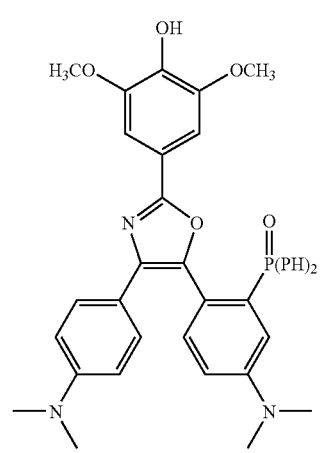
18
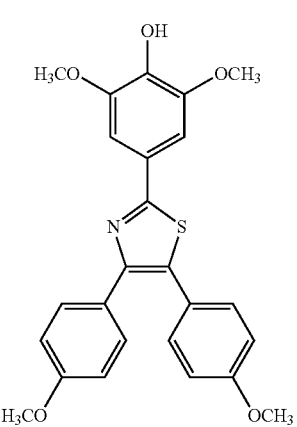
19
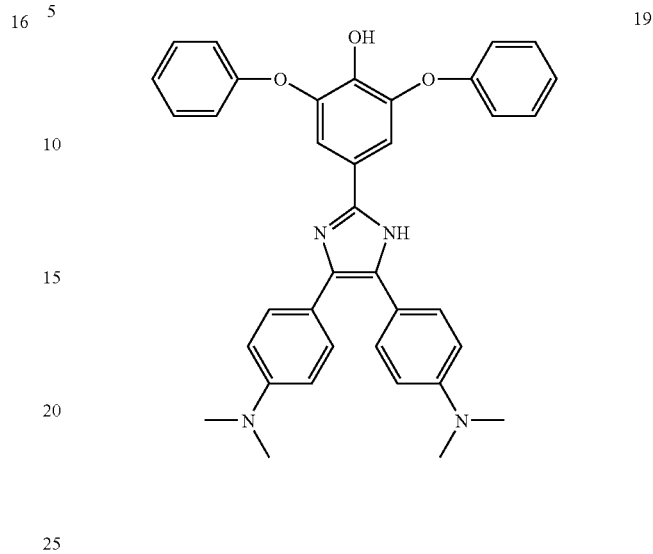
20
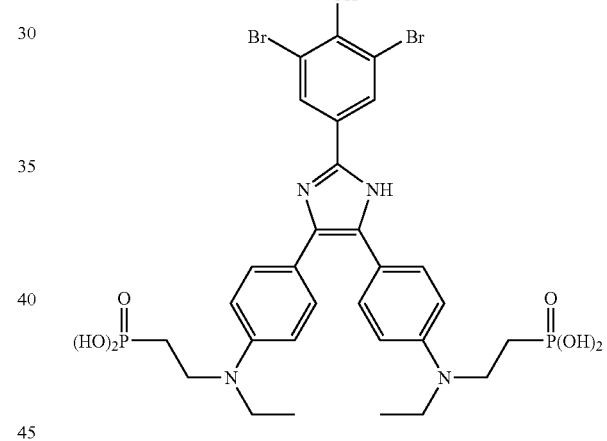
21
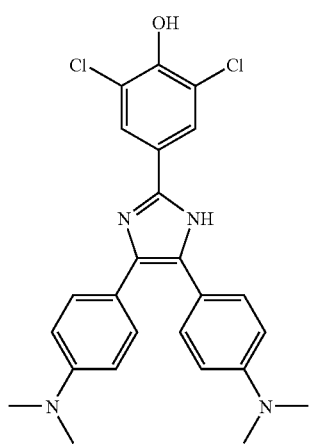

22
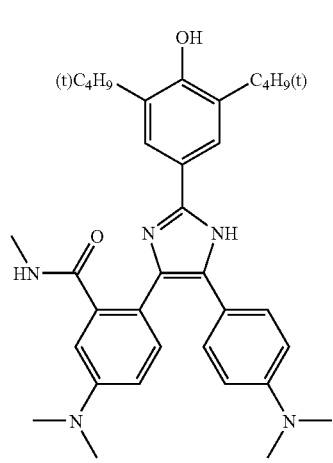
23
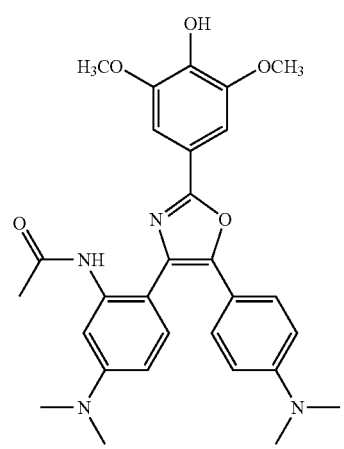
24
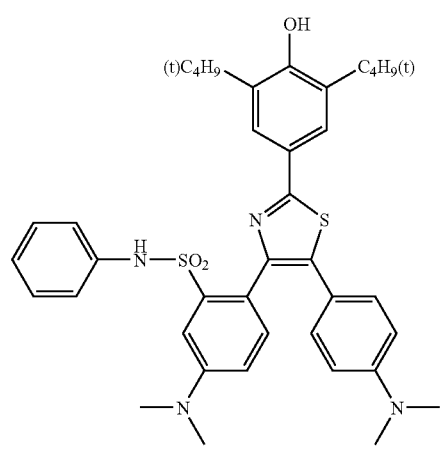
25
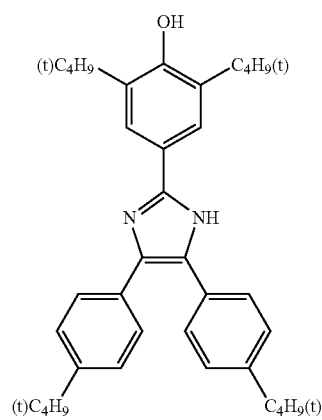
26
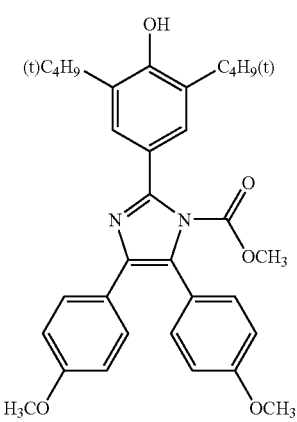
27
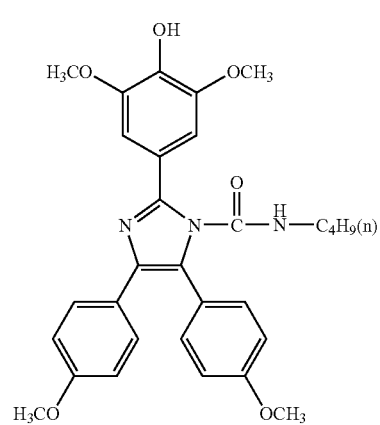

-continued
5
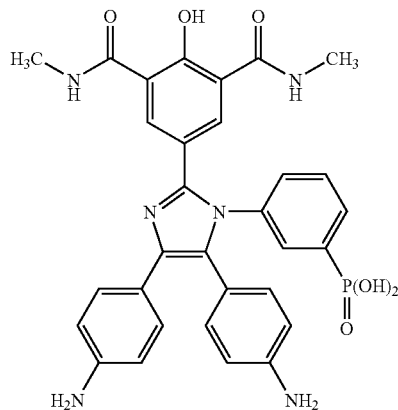
28
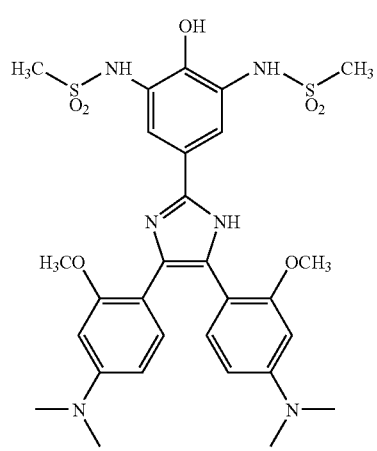
29
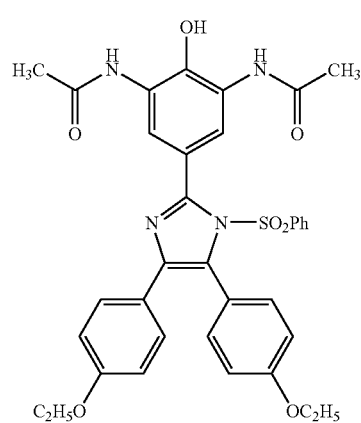
30
-continued
31
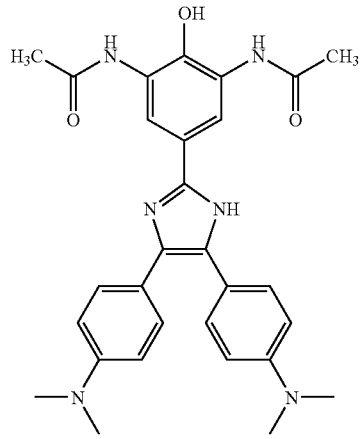
32
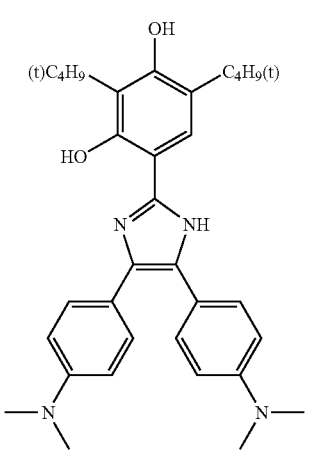
33
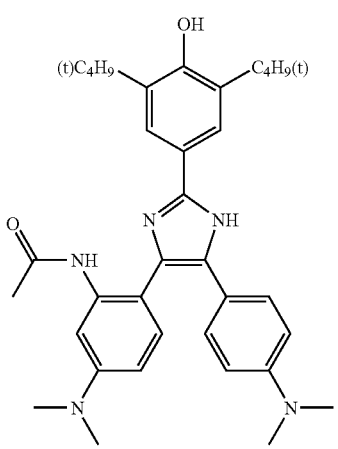

34 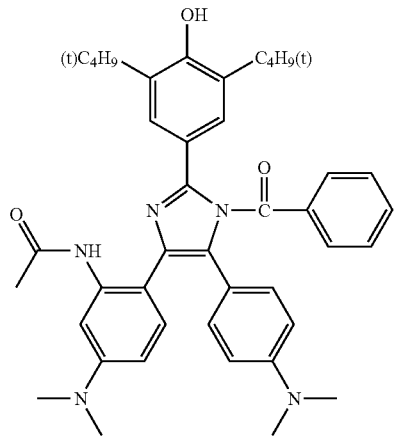
35 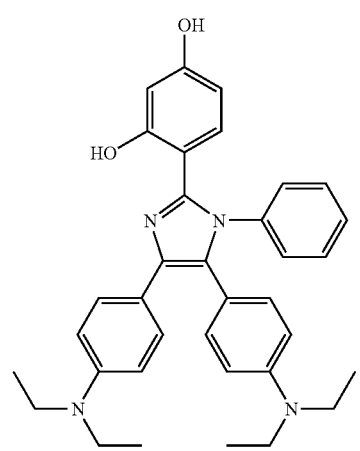
36 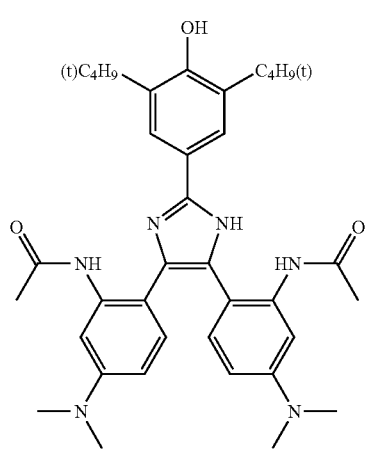
37 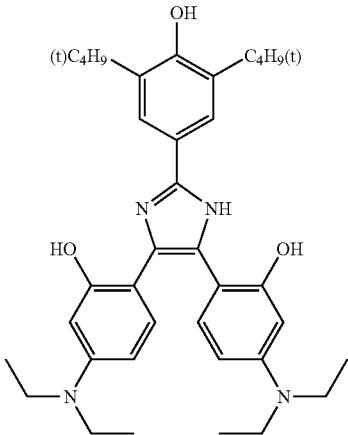
38 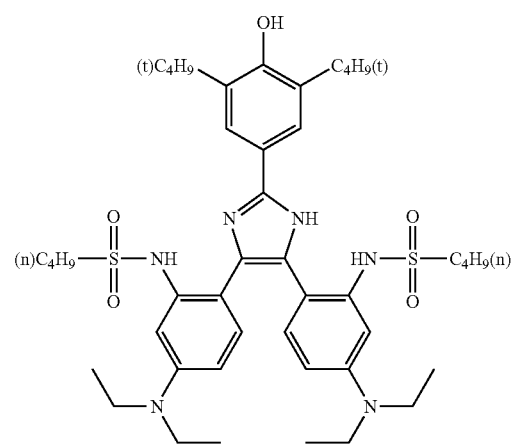
39 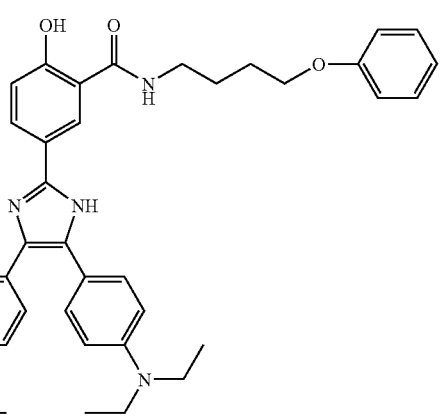

40
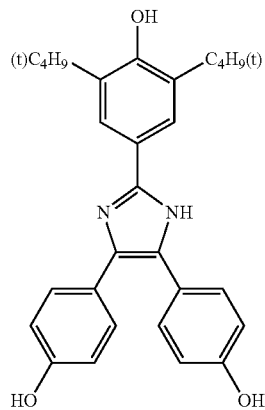
41
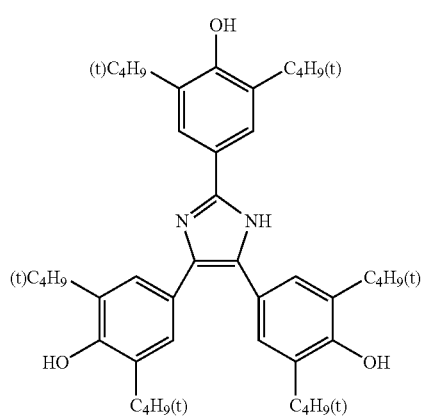
42
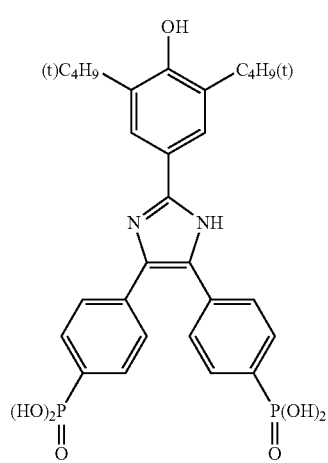
43
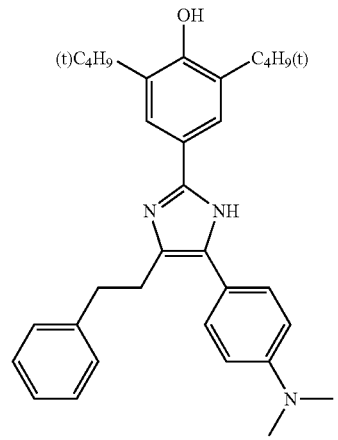
44
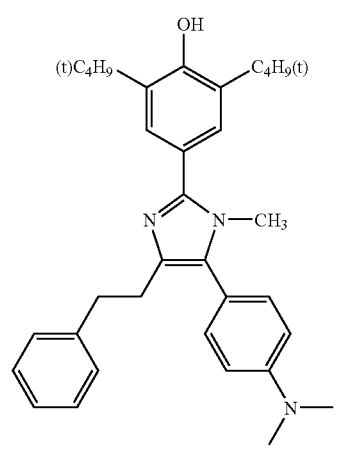
45
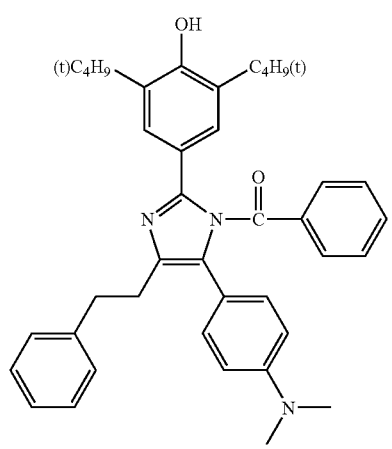

46 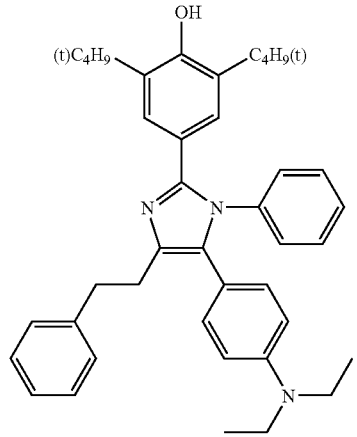
47 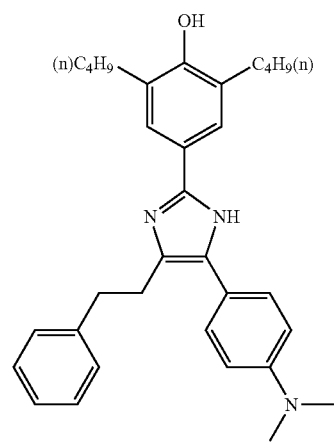
48 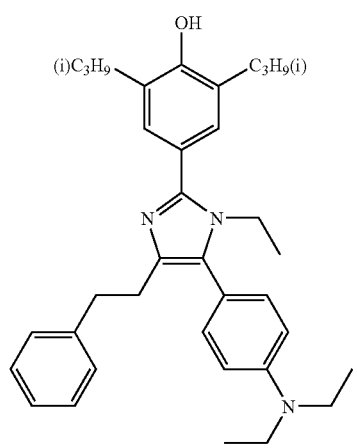
49 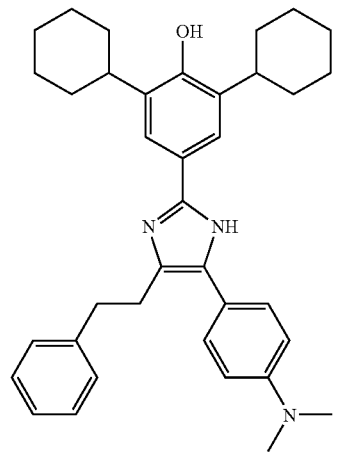
50 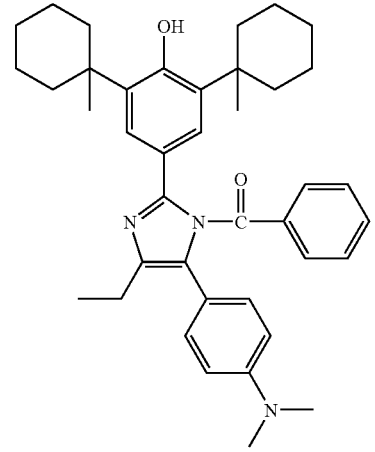
51 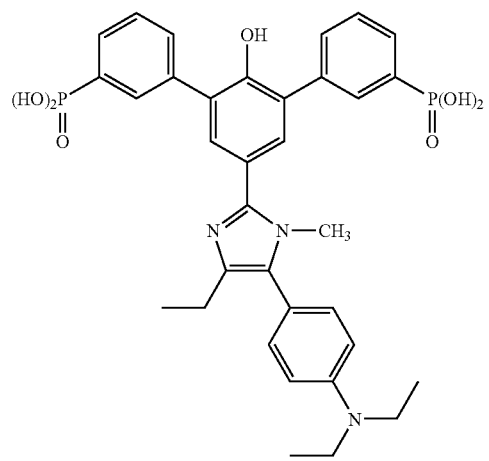

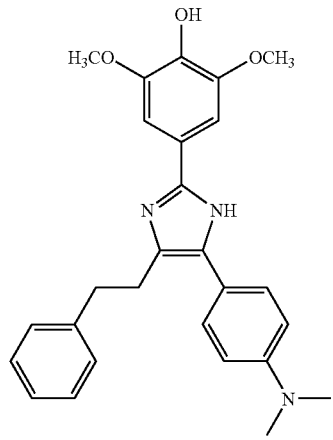
52
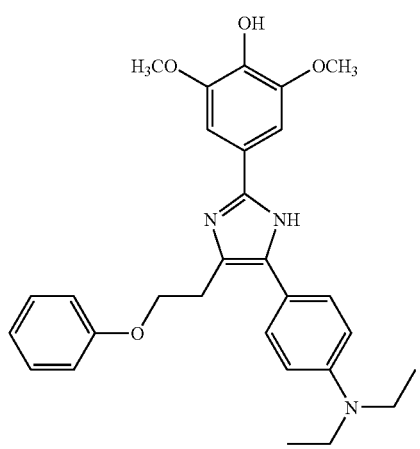
53
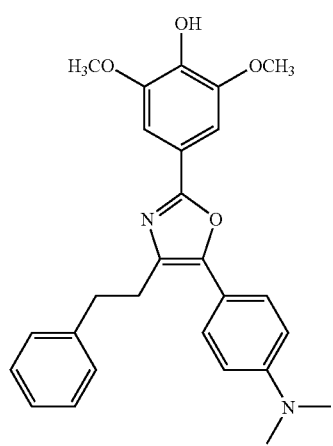
54
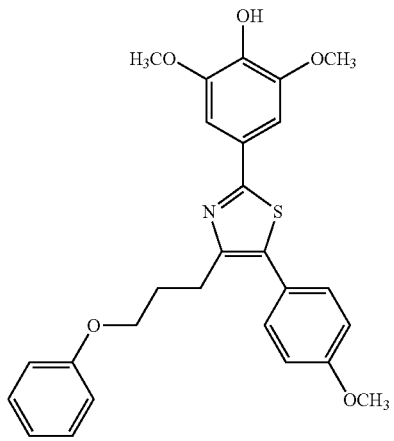
55
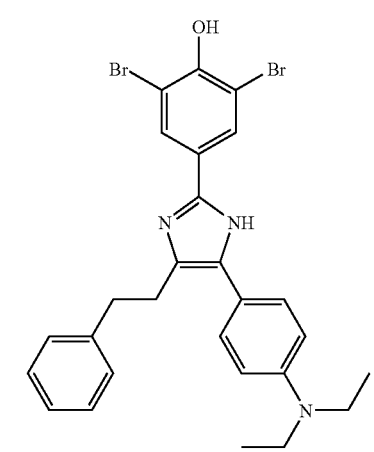
56
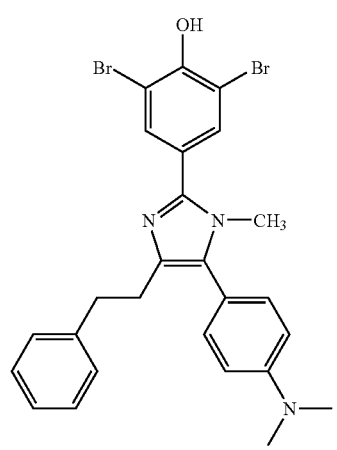
57

-continued
58
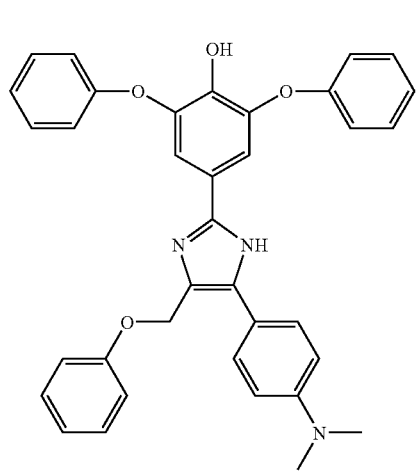
59
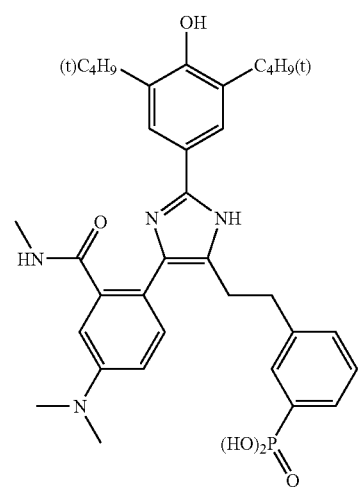
60
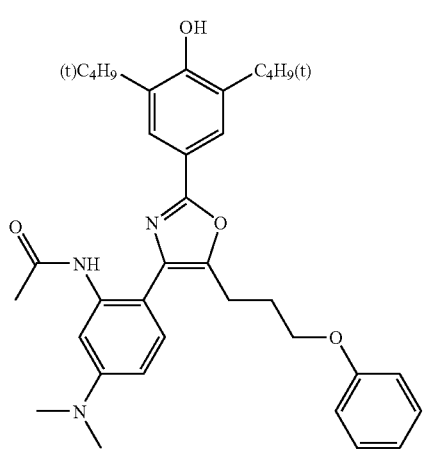
-continued
61
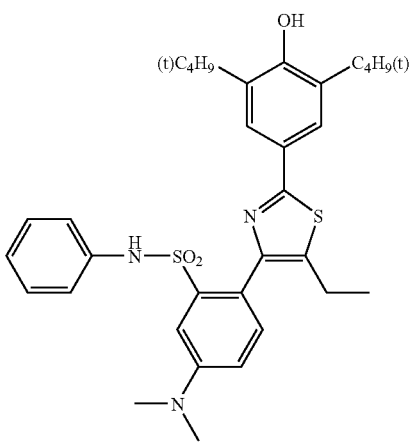
62
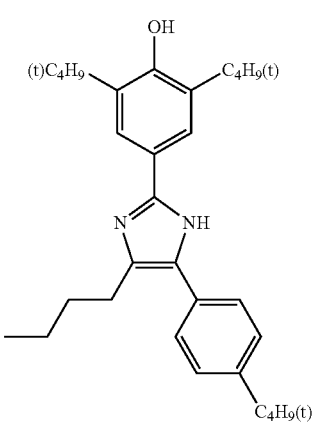
63
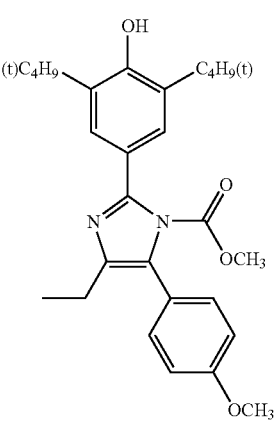

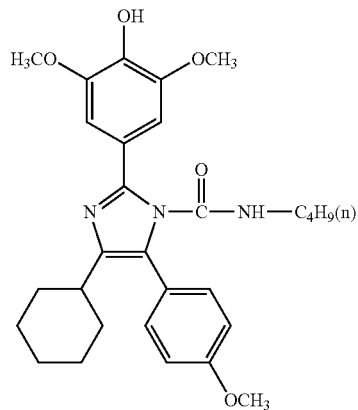
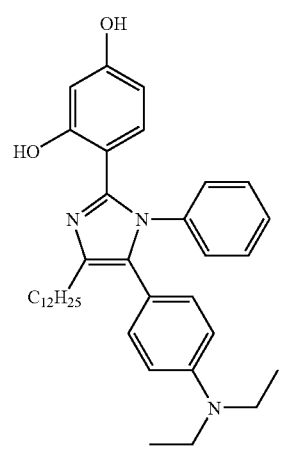
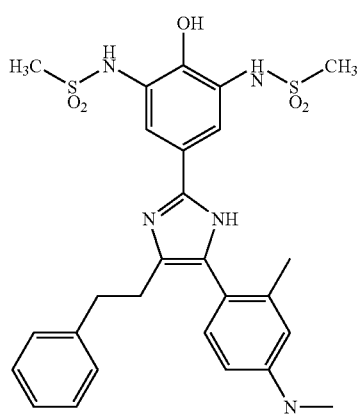
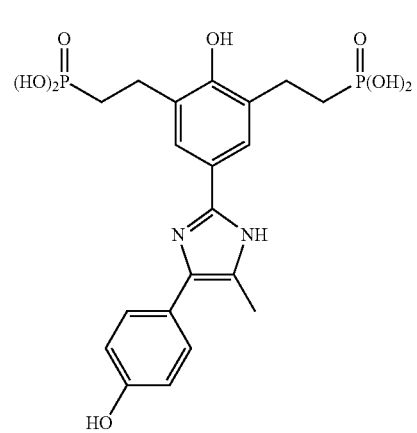
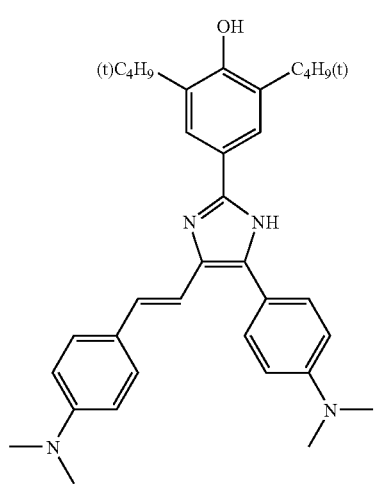
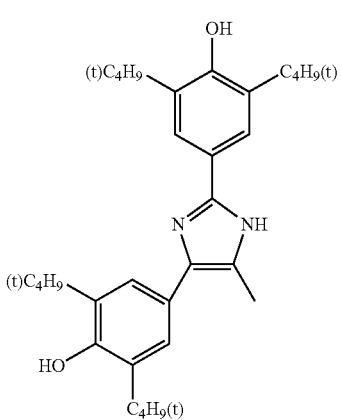

-continued
70
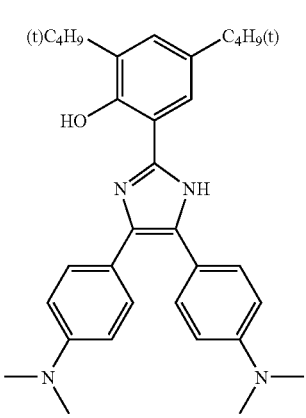
71
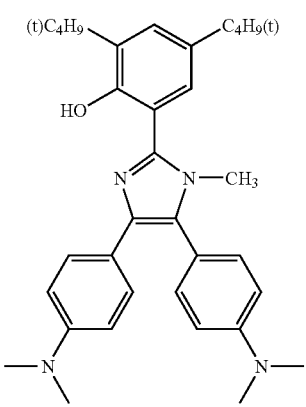
72
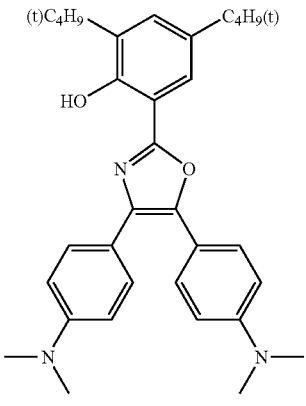
73
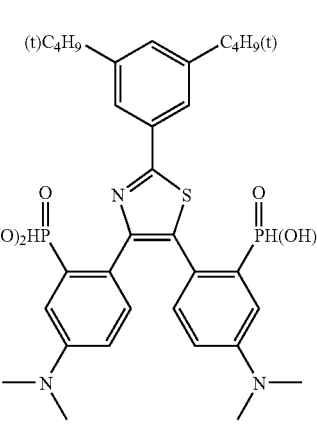
-continued
74
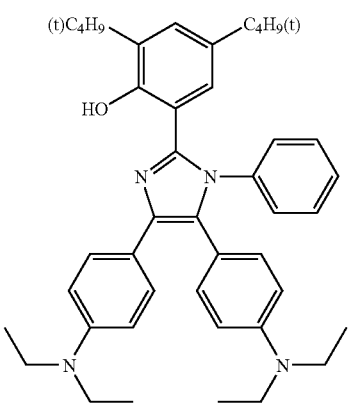
75
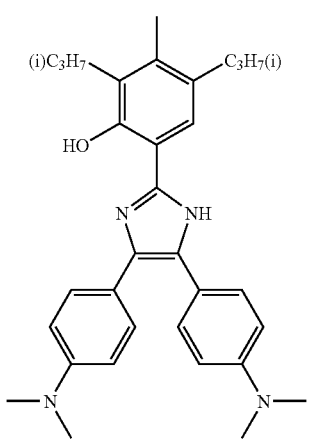
76
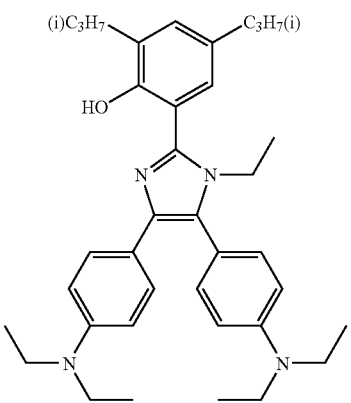

77
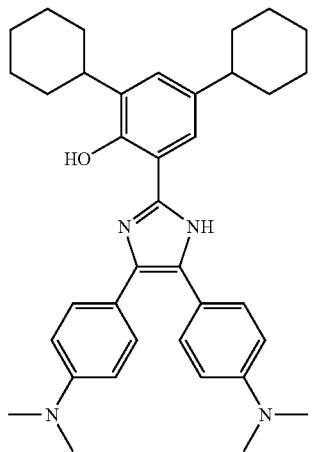
78
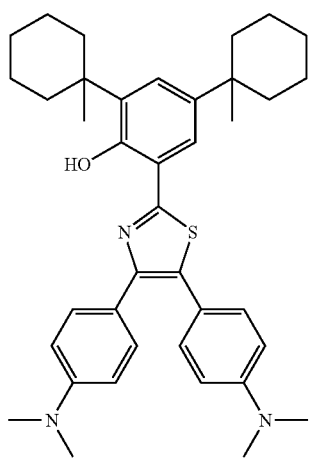
79
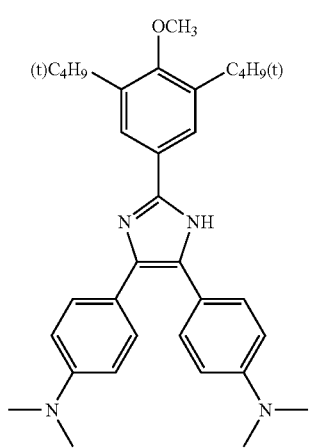
80
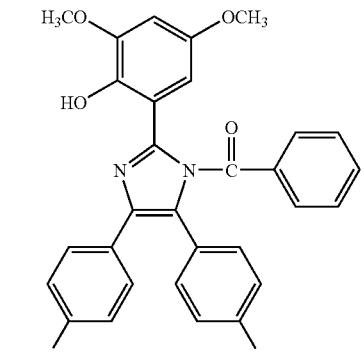
81
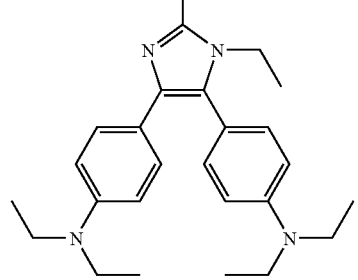
82
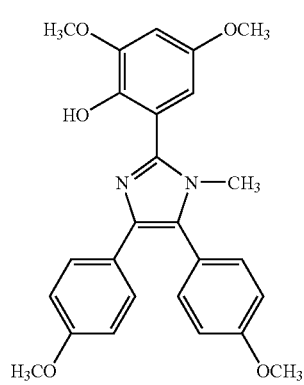
83
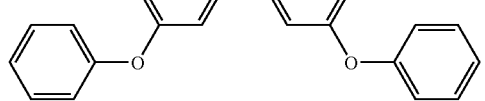

84
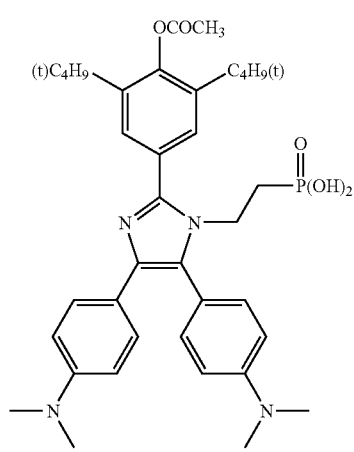
85
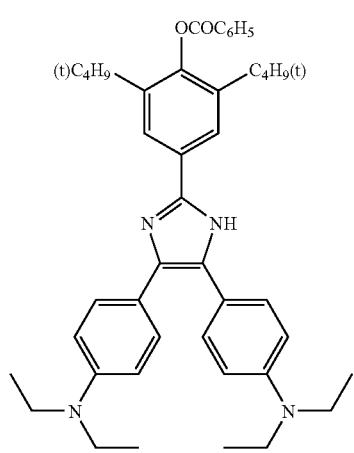
86
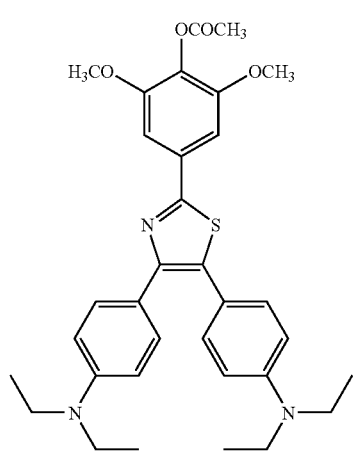
87
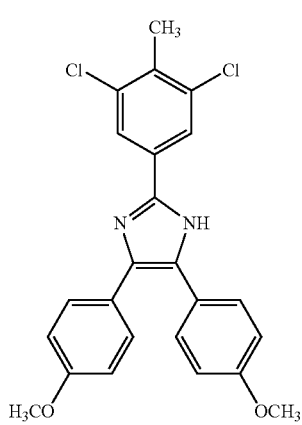
88
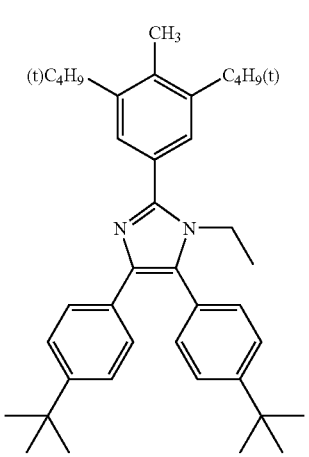
89
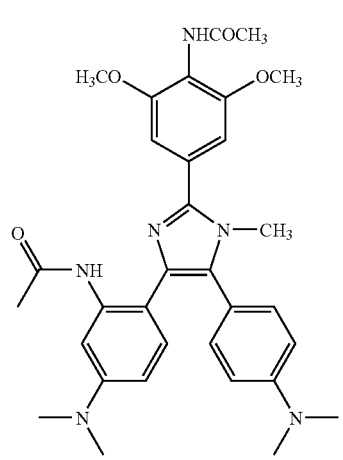

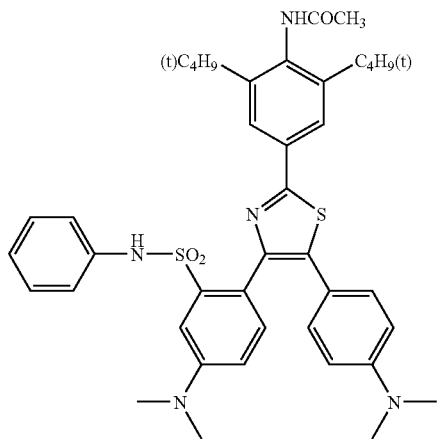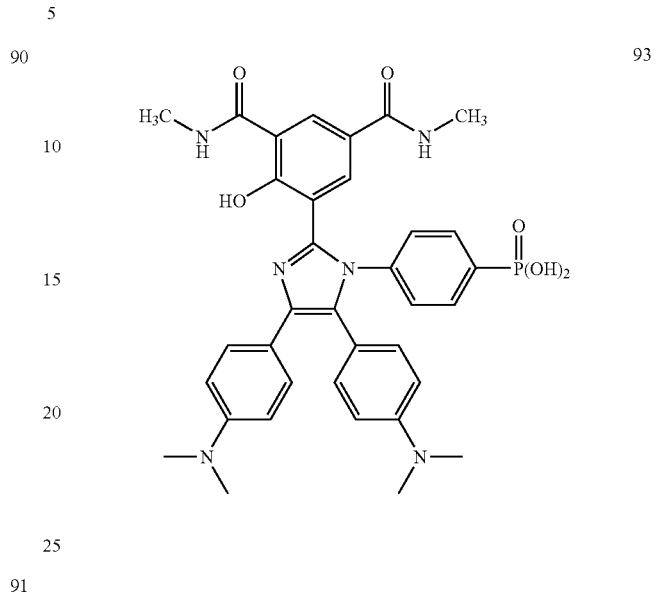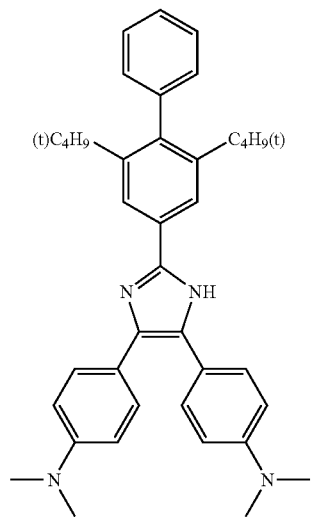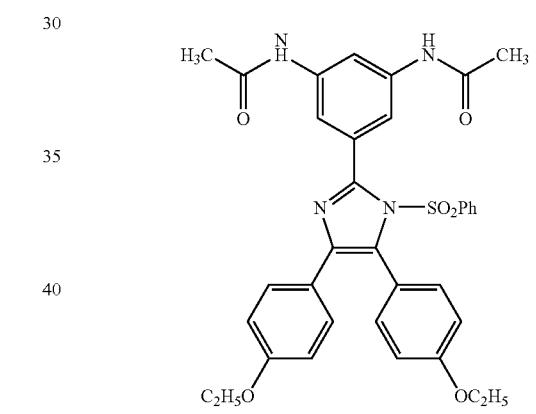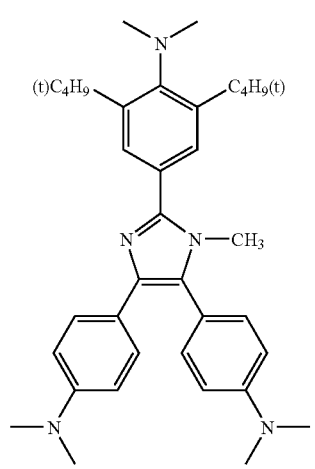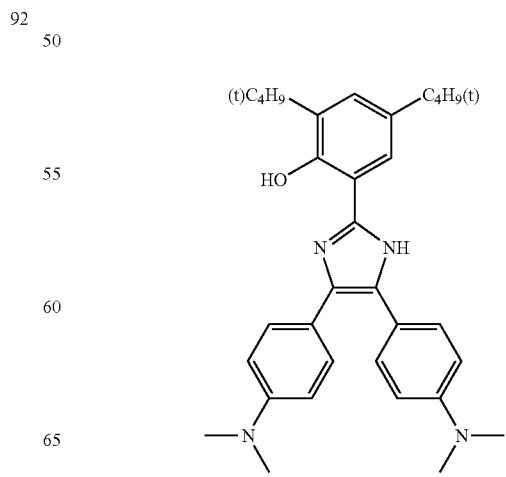

96
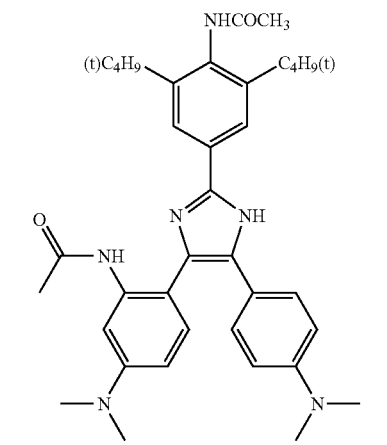
97
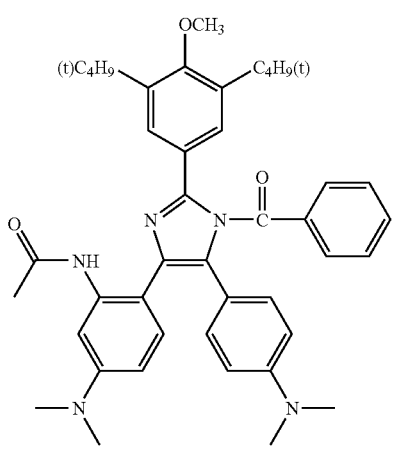
98
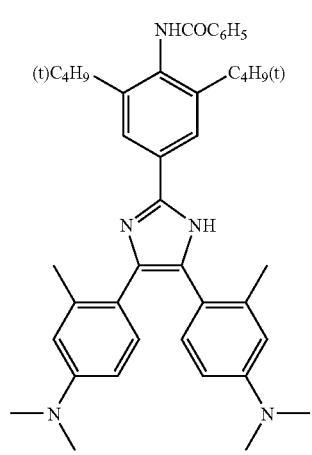
99
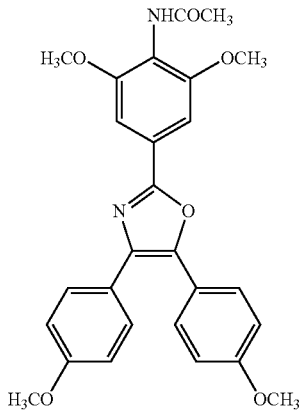
100
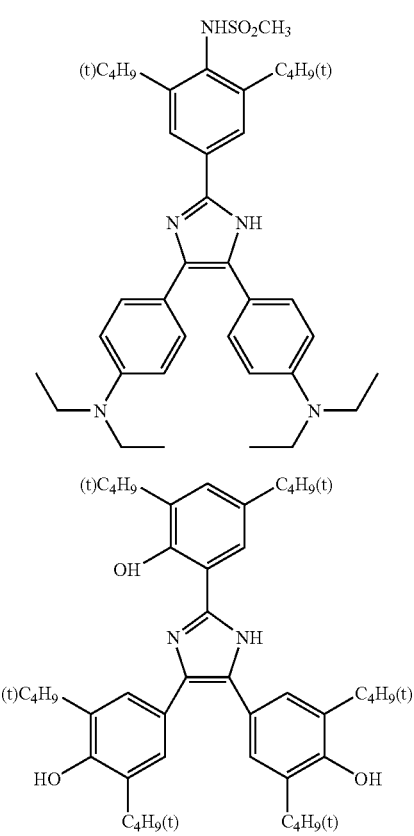
101
102
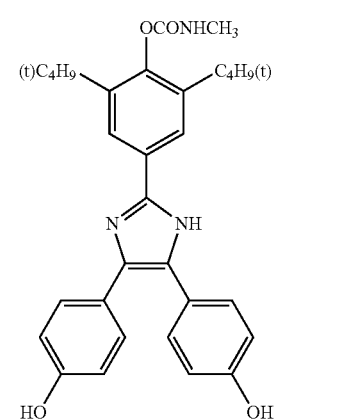

-continued
103
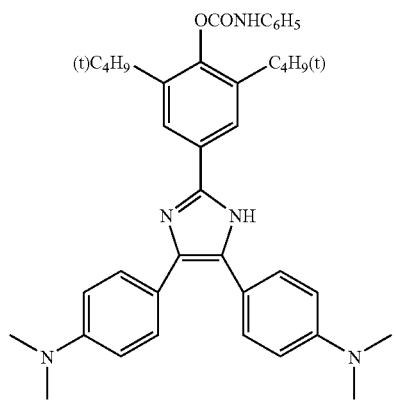
104
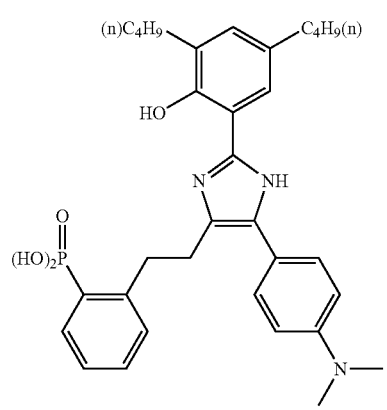
105
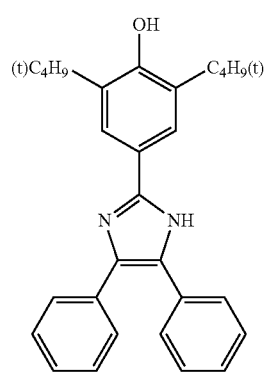
106
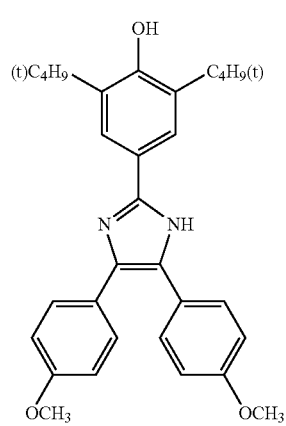
-continued
107
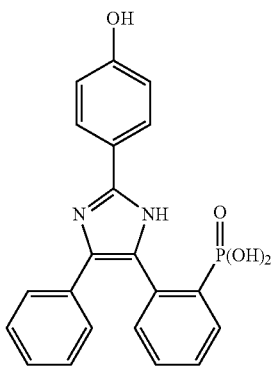
108
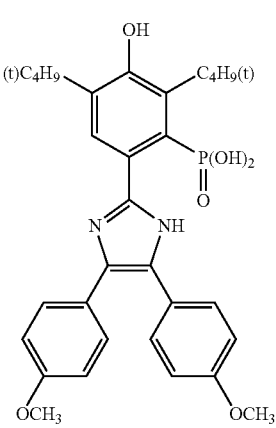
109
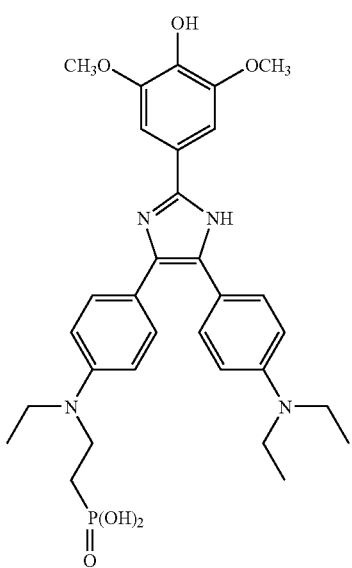

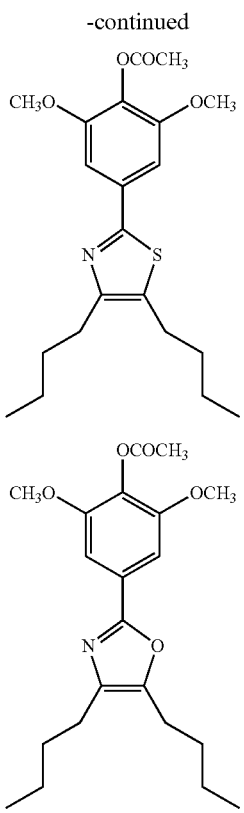

<Structure of a Display Element>

A structure of a display element incorporating the electrochromic compound, represented by Formula (1) of the present invention, is specifically not limited, but a specific example of the structure includes the following structures.

A) Substrate/transparent electrode/layer formed by bonding of transparent conductive microparticles/porous white scattering layer/electrode/substrate B) Substrate/transparent electrode/layer formed by bonding of transparent conductive microparticles/porous white scattering layer/layer formed by bonding of transparent conductive microparticles/electrode/substrate C) Substrate/transparent electrode/layer formed by bonding of transparent conductive microparticles/electron insulating layer/layer formed by bonding of transparent conductive microparticles/transparent electrode/substrate Further, the display element of the present invention may incorporate a counter electrode reactive substance in one electrode opposed to the other electrode, which subjects the compound represented by Formula (1) of the present invention to driving operation. Examples of the counter electrode reactive substances include, for example, quinones such as sulfohydroquinone, metallocenes such as ferrocene, phenothiazine compounds, and the compounds represented by Compound 1-Compound 37 described in Japanese Patent Publication Open to Public Inspection No. 2002-49061.

The electrochromic compound, represented by Formula (1) of the present invention, is preferably incorporated in an electrochromic display element in the range of at least 0.01 mmol/m$^2$-at most 10 mmol/m$^2$, but more preferably at least 0.1 mmol/m$^2$-at most 2 mmol/m$^2$.

Further, the electrochromic display element of the present invention preferably incorporates a plurality of the compounds represented by Formula (1). However, similarly to the case described above, these compounds are preferably incorporated in the range of at least 0.01 mmol/m$^2$-at most 10 mmol/m$^2$, but more preferably at least 0.1 mmol/m$^2$-at most 2 mmol/m$^2$.

Now, each of the components of the display element of the present invention is detailed below.

(Layer Formed by Bonding of Transparent Conductive Microparticles)

In the display element of the present invention, it is preferable that at least one of the counter electrodes incorporates a layer (being a layer formed by self-bonding of microparticles and by bonding of the microparticles and the electrode substrate, as described below) formed by bonding of transparent conductive microparticles. In some cases of the present invention, such a form is designated to as a porous electrode.

As microparticles constituting a layer formed by bonding of the transparent conductive microparticles, there are usable microparticles of polymethyl methacrylate, cellulose, polycarbonate, titanium oxide, silicon oxide, zinc oxide, alumina, or zeolite. Further, as conductive microparticles composed of the microparticles exhibiting conductivity, there are usable conductive microparticles of Sn-doped indium oxide (ITO), antimony-doped tin oxide (ATO), fluorine-doped tin oxide (FTO), or aluminum-doped zinc oxide, and further, microparticles prepared by coating ITO, ATO, or FTO onto the surface of titanium oxide microparticles. The term "conductivity" used herein refers to the powder resistance at a pressure of 10 MPa, which is in the range of at least 0.01 Ωcm-at most 100 Ωm, but is preferably at least 0.01 Ωcm-at most 10 Ωcm.

In the present invention, the average particle diameter of the microparticles is preferably in the range of at least 5 nm-10 μm, but is more preferably at least 20 nm-at most 1 μm. Further, the specific surface area thereof is preferably in the range of at least 1×10$^{-3}$ m$^2$/g-at most 1×10$^2$ m$^2$/g, but is more preferably at least 1×10$^{-2}$ m$^2$/g-at most 10 m$^2$/g, based on measurement using a simplified BET method. Incidentally, as the shape of the microparticles, any of the shapes including an amorphous, needle-like, and spherical one may be utilized.

Bonding of the transparent conductive microparticles of the present invention is preferably one using a transparent conductive film. A sol-gel method may be employed for bonding of the microparticles using the transparent conductive film, and ITO and ATO films may be formed via methods described, for example, in 1) Journal of the Ceramic Society of Japan, 102, 2, p 200 (1994), 2) Yogyo Kyokai Shi, 90, 4, p 157, and 3) J. of Non-Cryst. Solids, 82, 400 (1986). Further, using a sol liquid containing dispersed non-conductive microparticles such as spherical PMMA particles, a transparent conductive film is formed via a sol-gel method in order to form the transparent conductive film on the surface of the microparticles. Thus, the microparticles are bonded each other, and also bonded to the electrode substrate, whereby the created holes have a form having the outer shell composed of the transparent conductive film. Namely, an electrode substrate is prepared, incorporating a layer formed by bonding of the transparent conductive microparticles, whereby it is possible for the electrode to feature a specific surface area substantially increased.

FIG. 1 is a model view showing one example of the porous electrodes of the present invention.

In FIG. 1, microparticles 1, incorporating a conductive or transparent conductive film as the outer shell, constitute a layer formed by self-bonding of the microparticles and by bonding to an electrode substrate 2, and also holes, which are formed from the electrode substrate and the microparticles, incorporate a transparent conductive film 3 as the outer shell. And an electrolyte 4 fills the hole portions formed from the microparticles themselves, as well as from the electrode substrate and the microparticles.

Herein, bonding of the microparticles refers to a state in which the microparticle layer (being a layer formed by bonding of the transparent conductive microparticles) exhibits resistance of at least 0.1 g, preferably at least 1 g, when bonding force thereof is measured with a continuous weight surface measurement system (for example, scratch tester CSR-2 produced by Rhesca Co., Ltd.).

In the present invention, the transparent conductive microparticles or the transparent conductive film preferably carries an electrochromic compound, represented by Formula (1) of the present invention, to constitute an electrochromic display element capable of being colored in the targeted color tone or of forming the targeted color images. Further, a full-color electrochromic display element may be constituted by carrying a plurality of the electrochromic compounds, represented by Formula (1) of the present invention, in the same manner as described above, wherein the electrochromic compounds are colored in a specific color tone.

As a method of allowing the transparent conductive microparticles or the transparent conductive film to carry the electrochromic compound represented by Formula (1) of the present invention, the following one is preferably utilized: initially, a solution is prepared by dissolving an electrochromic compound in a solvent, in which the electrochromic compound is soluble and a solvent, contained in the electrolyte, is insoluble; the solution is applied to a transparent conductive film to adsorb the electrochromic compound, followed by removing the solvent. The method of applying the solution includes one in which a pattern-forming application is carried out using an ink-jet discharge device.

(Porous White Scattering Layer)

It is preferable that the display element of the present invention incorporates a porous white scattering layer between the counter electrodes.

The porous white scattering layer is formed by coating and drying an aqueous mixture of a water-soluble polymer, being substantially insoluble in the electrolyte solvent, and a white pigment.

Examples of the white pigment applicable to the present invention include, for example, titanium dioxide (anatase or rutile type), barium sulfate, calcium carbonate, aluminum oxide, zinc oxide, magnesium oxide, zinc hydroxide, magnesium hydroxide, magnesium phosphate, magnesium hydrogen phosphate, alkaline earth metallic salts, talc, kaolin, zeolite, acid clay, glass, and organic compounds such as polyethylene, polystyrene, acryl resins, ionomers, ethylene-vinyl acetate copolymeric resins, benzoguanamine resins, urea-formaldehyde resins, melamine-formaldehyde resins, or polyamide resins. These compounds may be utilized individually or in combination, or in the form wherein voids, capable of varying the refractive index, are contained in the particles.

Of these white particles, titanium dioxide, zinc oxide, and zinc hydroxide are preferably employed in the present invention. Further, employable are titanium dioxide surface-treated with an inorganic oxide (e.g., $Al_2O_3$, AlO(OH), or $SiO_2$), as well as titanium dioxide which is further treated with an organic compound such as trimethylol ethane, triethanolamine acetate or trimethylcyclosilane.

Of these white particles, titanium oxide or zinc oxide is more preferably employed from the viewpoint of prevention of coloring at high temperatures and of the reflectance of the element which is varied according to the refractive index of the particles.

Further, in the present invention, examples of the water-soluble polymers, which are substantially insoluble in the electrolyte solvent, include protein such as gelatin, or gelatin derivatives; cellulose derivatives; natural compounds such as polysaccharides including starch, gum arabic, dextran, pullulan, carageenan; and synthetic polymers such as polyvinyl alcohol, polyvinyl pyrrolidone, acrylamide polymers, or their derivatives. The gelatin derivatives include acetyl gelatin and phthalic gelatin. The polyvinyl alcohol derivatives include terminal alkyl-modified polyvinyl alcohol and terminal mercapto group-modified polyvinyl alcohol. The cellulose derivatives include hydroxyethyl cellulose, hydroxypropyl cellulose, and carboxymethyl cellulose. In addition, there are usable those described in Research Disclosure (hereinafter referred to also as RD) and on pages 71-75 of Japanese Patent Publication Open to Public Inspection (hereinafter referred to as JP-A) No. 64-13546; highly water-absorbing polymers described in U.S. Pat. No. 4,960,681 and JP-A 62-245260, including homopolymers of vinyl monomers containing —COOM or —$SO_3$M (wherein M is a hydrogen atom or an alkali metal), and copolymers of these monomers or copolymers of the same and other monomers (for example, sodium methacrylate, ammonium methacrylate or potassium acrylate).

Gelatin, gelatin derivatives, polyvinyl alcohol or their derivatives are preferably employed in the present invention.

According to the present invention, being substantially insoluble in the electrolyte solvent is defined as a state wherein a dissolution amount per kilogram of the electrolyte solvent is in the range of at least 0 g-at most 10 g, and the dissolution amount is determined via a method known in the art including a weight measuring method and a component determination method such as liquid chromatography or gas chromatography.

It is preferable that an aqueous mixture of the water-soluble polymer and the white pigment of the present invention be in the form in which the white pigment is dispersed in water using a dispersion method known in the art. The mixture ratio of water-soluble polymer/white pigment is preferably from 0.01 to 1, and is more preferably from 0.05 to 0.3 based on a volume ratio.

A medium, on which the aqueous mixture of the water-soluble polymer and the white pigment of the present invention is coated, may be any of the components between the counter electrodes of the display element, but the mixture is preferably applied on at least one of the counter electrodes. Methods of application to the medium include, for example, a coating method; a liquid spraying method; a spraying method via a gas phase, in which droplets are ejected via vibration of a piezoelectric element, such as a piezo-type ink-jet head or a BUBBLE JET (a trade mark) type ink-jet head in which droplets are ejected using a thermal head via a bumping phenomenon; and a spraying method in which liquid is sprayed via air or liquid pressure.

Any coating method known in the art may be appropriately selected as the coating method, including, for example, an air doctor coater, a blade coater, a rod coater, a knife coater, a squeeze coater, an immersing coater, a reverse roller coater, a transfer roller coater, a curtain coater, a double roller coater, a slide hopper coater, a gravure coater, a kiss roll coater, a bead coater, a cast coater, a spray coater, a calender coater, and an extrusion coater.

Any method may be employed to dry the aqueous mixture of the water-soluble polymer and the white pigment of the present invention applied on the medium, provided that the water is evaporated via the selected method. Examples include heating via a heat source, infrared light, or electromagnetic induction. Further, water evaporation may be carried out under reduced pressure.

According to the present invention, "being porous" refers to a penetration state described as follows; porous white scattering substances are formed by coating an aqueous mixture of the water-soluble polymer and the white pigment of the present invention on the electrode, followed by drying the aqueous mixture; an electrolyte liquid, containing silver or a compound having silver in its chemical structure, is applied on the scattering substances, and sandwiched between the counter electrodes; and an electric potential difference is applied between the counter electrodes to enable silver to be dissolved and deposited, whereby ionic species are allowed to migrate between the electrodes.

In the display element of the present invention, it is preferable that the water-soluble polymer is hardened using a hardener during coating and drying the above aqueous mixture or after drying the same.

Examples of the hardeners employed in the present invention include the hardeners described, for example, in U.S. Pat. No. 4,678,739, column 41, U.S. Pat. No. 4,791,042, JP-A No. 59-116655, JP-A No. 62-245261, JP-A No. 61-18942, JP-A 61-249054, JP-A No. 61-245153, and JP-A No. 4-218044. More specifically, there are exemplified aldehyde based hardeners (e.g., formaldehyde), aziridine based hardeners, epoxy based hardeners, vinyl sulfone based hardeners (e.g., N,N'-ethylene-bis(vinylsulfonylacetamido)ethane), N-methylol based hardeners (e.g., dimethylol urea), boric acid, metaboric acid, or polymer hardeners (compounds described, for example, in JP-A No. 62-234157).

These hardeners are utilized in the range of at least 0.001 g-at most 1 g per gram of the water-soluble polymer, more preferably at least 0.005 g-at most 0.5 g. Further, heat treatment, or humidity adjustment during hardening reaction may be applied to improve film hardness.

(Electrolytes)

An electrolyte is arranged between the electrodes in the electrochromic display element of the present invention. The electrolyte may be utilized as follows: the electrolyte is injected into the space created between the sealed electrodes via a vacuum injection method, air injection method, or meniscus method; or an electrode layer is formed on the electrode via a sputtering method, deposition method, or sol-gel method, followed by uniting the counter electrodes; or a laminated glass sheet is formed using an film electrolyte.

The electrolyte is not specifically limited, provided that it is possible to make the electrochromic compound of the present invention colored, colorless, and color changed via oxidation/reduction, whereby the display element is colored and rendered colorless. However, it is preferable to employ substances, which commonly exhibit an ionic conductivity of at least $1 \times 10^{-7}$ S/cm at room temperature. Further, it is possible to employ a liquid system or a gelling liquid system, which fills the holes formed by the microparticles themselves, and by the electrode substrate and the microparticles, described above.

As the liquid system, a system prepared by dissolving a supporting electrolyte such as a salt, acid, or alkali in a solvent may be employed. The solvent is not specifically limited, if dissolving the supporting electrode, but the solvent exhibiting polarity is preferably employed. Specific examples include water, and polar organic solvents such as methanol, ethanol, propylene carbonate, ethylene carbonate, dimethylsulfoxide, dimethoxyethane, acetonitrile, γ-butyrolactone, γ-valerolactone, sulfolane, dimethyl formamide, dimethoxyethane, tetrahydrofuran, acetonitrile, propionenitrile, glutaronitrile, adiponitrile, methoxyacetonitrile, dimethylacetamide, methylpyrrolidine, dimethylsulfoxide, dioxolane, sulfolane, trimethylphosphate, or polyethylene glycol. Preferable are polar organic solvents such as propylene carbonate, ethylene carbonate, dimethylsulfoxide, dimethoxyethane, acetonitrile, γ-butyrolactone, sulfolane, dioxolane, dimethyl formamide, dimethoxyethane, tetrahydrofuran, adiponitrile, methoxyacetonitrile, dimethylacetamide, methylpyrrolidine, dimethylsulfoxide, dioxolane, sulfolane, trimethylphosphate, polyethylene glycol. These solvents may be utilized individually or in combination.

The salts utilized as the supporting electrolyte are not specifically limited, including ionic inorganic salts such as various types of alkali metallic salts or alkaline earth metallic salts, quaternary ammonium salts, and cyclic quaternary ammonium salts. Specific examples preferably include alkali metallic salts of Li, Na, or K such as $LiClO_4$, LiSCN, $LiBF_4$, $LiAsF_6$, $LiCF_3SO_3$, $LiPF_6$, LiI, NaI, NaSCN, $NaClO_4$, $NaBF_4$, $NaAsF_6$, KSCN, or KCl, and quaternary ammonium salts and cyclic quaternary ammonium salts such as $(CH_3)_4NBF_4$, $(C_2H_5)_4NBF_4$, $(n-C_4H_9)_4NBF_4$, $(C_2H_5)_4NBr$, $(C_2H_5)_4NClO_4$, or $(n-C_4H_9)_4NClO_4$, or mixtures thereof. The acids utilized as the supporting electrolyte are not specifically limited, including inorganic and organic acids such as sulfuric acid, hydrochloric acid, phosphoric acids, sulfonic acids, or carboxylic acids. The alkalis utilized as the supporting electrolyte are not specifically limited, including sodium hydroxide, potassium hydroxide, or lithium hydroxide.

As the gelling liquid based electrolyte, employable are viscous or gel substances prepared by further incorporating a polymer or a gelling agent in the liquid based electrolyte. The polymer employed is not specifically limited, including, for example, polyacrylonitrile, carboxymethyl cellulose, polyvinyl chloride, polyethylene oxide, polyurethane, polyacrylate, polymethacrylate, polyamide, cellulose, polyester, polypropylene oxide, and NAFION. Further, the gelling agent is not specifically limited, including oxyethylene methacrylate, oxyethylene acrylate, urethane acrylate, acrylamide, and agar.

(Thickeners Added to the Electrolyte)

Thickeners may be utilized together with the electrolyte in the present invention. Examples thereof include gelatin, gum arabic, poly(vinyl alcohol), hydroxyethyl cellulose, hydroxypropyl cellulose, cellulose acetate, cellulose acetate butyrate, poly(vinyl pyrrolidone), poly(alkylene glycol), casein, starch, poly(acrylic acid), poly(methylmethacrylic acid), poly(vinyl chloride), poly(methacrylic acid), copoly(styrene-maleic acid anhydride), copoly(styrene-acrylonitrile), copoly(styrene-butadiene), poly(vinyl acetal) series (e.g., poly(vinyl formal) and poly(vinyl butyral), poly(ester) series, poly(urethane) series, phenoxy resins, poly(vinylidene chloride), poly(epoxide) series, poly(carbonate) series, poly(vinyl acetate), cellulose esters, poly(amide) series, and as transparent hydrophobic binders, polyvinyl butyral, cellulose acetate, cellulose acetate butyrate, polyester, polycarbonate, polyacrylic acid, and polyurethane are exemplified.

These thickeners may be utilized in combinations of at least two kinds thereof. Further, the compounds described on pages 71-75 of JP-A No. 64-13546 may be cited. Of these, compounds preferably employed include polyvinyl alcohol series, polyvinyl pyrrolidone series, hydroxypropyl cellulose series, and polyalkylene glycol series from the viewpoint of compatibility with various additives and of the increase in dispersion stability of the white particles.

(Other Additives)

As constituent layers of the present invention, auxiliary layers such as a protective layer, a filter layer, an anti-halation layer, a crossover light cutting layer, or a backing layer are employed. These auxiliary layers may contain the following substances, as appropriate: various chemical sensitizers, noble metal sensitizers, sensitizing dyes, supersensitizers, couplers, high-boiling solvents, antifoggants, stabilizers, development inhibitors, bleaching accelerators, fixing accelerators, color mixing inhibitors, formalin scavengers, color improvers, hardeners, surfactants, thickeners, plasticizers, slipping agents, ultraviolet absorbents, anti-irradiation dyes, filter light-absorbing dyes, anti-fungal agents, polymer latexes, heavy metals, antistatic agents, and matting agents.

The above additives are further detailed in RD, Vol. 176, Item 17643 (December 1978), ibid., Vol. 184, Item 18431 (August 1979), ibid., Vol. 187, Item 18716 (November 1979), and ibid., Vol. 308, Item 308119 (December 1989).

The relevant compounds and portions described in these references are listed below.

| | RD17643 | | RD18716 | | RD308119 | |
|---|---|---|---|---|---|---|
| Additive | Page | Classification | Page | Classification | Page | Classification |
| Chemical Sensitizer | 23 | III | 648 | upper right | 96 | III |
| Sensitizing Dye | 23 | IV | 648-649 | | 996-8 | IV |
| Desensitizing Dye | 23 | IV | | | 998 | IV |
| Dye | 25-26 | VIII | 649-650 | | 1003 | VIII |
| Development Promoter | 29 | XXI | 648 | upper right | | |
| Antifoggant, Stabilizer | 24 | IV | 649 | upper right | 1006-7 | VI |
| Brightener | 24 | V | | | 998 | V |
| Hardener | 26 | X | 651 | left | 1004-5 | X |
| Surfactant | 26-7 | XI | 650 | right | 1005-6 | XI |
| Antistatic Agent | 27 | XII | 650 | right | 1006-7 | XIII |
| Plasticizer | 27 | XII | 650 | right | 1006 | XII |
| Slipping Agent | 27 | XII | | | | |
| Matting Agent | 28 | XVI | 650 | right | 1008-9 | XVI |
| Binder | 26 | XXII | | | 1003-4 | IX |
| Support | 28 | XVII | | | 1009 | XVII |

(Substrates)

As substrates employed for the display element of the present invention, there are also preferably usable synthetic plastic films including polyolefins such as polyethylene or polypropylene, polycarbonates, cellulose acetate, polyethylene terephthalate, polyethylene dinaphthalene carboxylate, polyethylene naphthalates, polyvinyl chloride, polyimides, polyvinyl acetals, and polystyrene. Polystyrenes having a syndiotactic structure are also preferable. These substances may be prepared via methods described, for example, in JP-A No. 62-117708, JP-A No. 1-46912, and JP-A No. 1-178505. Further, there are exemplified metallic substrates such as stainless steel, paper supports such as baryta paper or resin-coated paper, supports prepared by forming a reflecting layer on the above plastic film, and the supports described in JP-A No. 62-253195 (pages 29-31). Also preferable are those described on page 28 of RD No. 17643, in the right column of page 647—left column of page 648 of ibid., No. 18716, and page 879 of ibid., No. 307105. The roll-set curl of these supports may be minimized via a thermal treatment at a temperature of at most Tg as described in U.S. Pat. No. 4,141,735. Further, the surface of the supports may be surface treated to improve adhesion to other constituent layers. In the present invention, glow discharge treatment, ultraviolet irradiation treatment, corona discharge treatment, and flame treatment may be employed to treat the surface. Further, the supports described on pages 44-149 of Kochi Gijutsu (Known Techniques), No. 5 (issued on Mar. 22, 1991, published by Aztech Corp.) may be utilized. Still further, there are exemplified those described on page 1009 of RD, No. 308119, and in "Supports" of Product Lisencing Index, Vol. 92, Page 108. In addition, glass substrates, and glass-incorporating epoxy resins are employable.

(Counter Electrodes)

In the present invention, metallic electrodes are employable as at least one of the electrodes. It is possible to utilize metals known in the art such as platinum, gold, silver, copper, aluminum, zinc, nickel, titanium, or bismuth, as well as alloys thereof as the metallic electrodes. In cases in which silver is contained in the electrolyte, metals, featuring a work function close to the oxidation reduction potential of silver, are preferable as the metallic electrodes. Therefore, silver electrodes, or silver alloy electrodes of at least 80% silver content are advantageous for maintaining the reduced state of silver, as well as for preventing electrode stain. As preparation methods of the electrodes, a deposition method, printing method, ink-jet method, spin-coating method, and CVD method may be utilized.

Further, in the display element of the present invention, it is preferable that at least one of the counter electrodes be a transparent electrode. The transparent electrode is not specifically limited, if being transparent and conductive. Examples thereof include Indium Tin Oxide (ITO: indium tin oxide), Indium Zinc Oxide (IZO: indium zinc oxide), fluorine-doped tin oxide (FTO), indium oxide, zinc oxide, platinum, gold, silver, rhodium, copper, chromium, carbon, aluminum, silicon, amorphous silicon, and BSO (Bismuth Silicon Oxide). To prepare the electrode in this way, for example, mask-depositing an ITO film onto the substrate via a sputtering method, or pattering via a photolithography is carried out after the ITO film is entirely formed on the substrate. The surface resistance of the transparent electrode is preferably at most 100Ω/□, but is more preferably at most 10Ω/□. The thickness thereof is not specifically limited; however, being commonly 0.1-20 μm.

(Other Components of the Display Element)

For the display element of the present invention, sealing agents, columnar structure substances, and spacer particles are employable, as appropriate.

The sealing agents, functioning to enclose the content in order not to emerge, are also designated as enclosing agents. As the sealing agents, there are employable curable type resins including thermally curable, light curable, moisture curable, or anaerobically curable resins such as epoxy resins, urethane based resins, acrylic resins, vinyl acetate based resins, enethiol based resins, silicon based resins, or modified polymer resins.

The columnar structure substance provides strong self-holding force (strength) between the substrates, including columnar structure substances such as cylindrical, square pole, elliptically cylindrical, and trapezoidally cylindrical substances, wherein, for example, these substances are arranged so as to form a predetermined pattern such as a grid at regular intervals. A stripe arrangement at predetermined intervals may be also employed. The columnar structure substance is not arranged at random, but preferably arranged in such a manner as to appropriately hold the distance between the substrates, and not to inhibit displaying images, wherein the columnar structure substance is arranged at regular intervals, in an pattern in which the intervals are gradually varied, or in a predetermined pattern repeated at regular intervals. When the ratio of the display area of the display element occupied by the columnar structure substance is in the range of at least 1%-at most 40%, the display element exhibits practically adequate strength.

A spacer may be placed between a pair of the substrates to uniformly hold the gap thereof. As the spacer, spherical objects of resins or inorganic oxides are exemplified. An adhesive spacer, the surface of which is coated with a thermoplastic resin, may be also preferably employed. To uniformly hold the gap between the substrates, the columnar structure substance may be located by itself, and both of the spacer and the columnar structure substance may be also located. Further, instead of the columnar structure substance, the spacer may be utilized by itself as a space-holding member. When the spacer is formed into a columnar structure, the diameter of the spacer is equivalent to at most the height of the columnar structure substance, but is preferably equal to the height thereof. When no columnar structure substance is formed, the diameter of the spacer is equivalent to the cell gap thickness.

(Screen Printing)

In the present invention, a sealing agent, a columnar structure substance, and an electrode pattern may be formed via a screen printing method. In the screen printing method, the electrode surface of the substrate is covered with a screen having a predetermined pattern, followed by placing a printing material (being a composition, to form the columnar structure substance, such as radiation curable resins) on the screen. Subsequently, a squeegee is moved at a predetermined pressure, angle, and rate, whereby the printing material is transferred onto the substrate via the screen pattern, and then the transferred material is thermally cured and dried. When the columnar structure substance is formed via the screen printing method, resin materials to be used are not limited to the radiation curable resins. For example, thermally curable resins or thermoplastic resins such as epoxy resins or acrylic resins may be also employed. Examples of the thermoplastic resins include polyvinyl chloride resins, polyvinylidene chloride resins, polyvinyl acetate resins, polymethacrylate resins, polyacrylate resins, polystyrene resins, polyamide resins, polyethylene resins, polypropylene resins, fluorine resins, polyurethane resins, polyacrylonitrile resins, polyvinyl ether resins, polyvinyl ketone resins, polyether resins, polyvinyl pyrrolidone resins, saturated polyester resins, polycarbonate resins, and chlorinated polyether resins. The resin materials are preferably utilized in a paste form wherein the resins are dissolved in appropriate solvents.

After the columnar structure substance has been formed on the substrate, a spacer is provided on at least one of the substrates, as appropriate, and then a pair of the substrates are lapped to form an empty cell, wherein the electrode-forming surfaces are faced each other. A display cell is obtained by bonding a pair of the lapped substrates via heat application under pressure applied from both sides thereof. To prepare a display element, an electrolyte composition is injected between the substrates, for example, via a vacuum injection method. Or, in the bonding process of the substrates, a liquid crystal component may be enclosed just before bonding of the substrates, after the electrolyte component has been dripped on one of the substrates.

(Driving Method of the Display Element)

The display element of the present invention displays images, wherein the counter electrodes are subjected to driving operation so that the electrochromic compound, represented by Formula (1) of the present invention, is colored via oxidation and rendered colorless via reduction.

Methods of driving an electrochromic display device in the present invention include the methods described, for example, on pages 77-102 of "Electrochromic Displays" (1991, published by Sangyo Tosho Publishing Co., Ltd.).

The driving operation for the display element is either a simple matrix drive or an active matrix one. In the present invention, the simple matrix drive refers to a driving method, in which current is successively applied to a circuit formed by vertically crossing of an anode line containing plural anodes to a facing cathode line containing plural cathodes. The use of the simple matrix drive has the advantage that the circuit structure and the driving IC are capable of being simplified to reduce the production cost. The active matrix drive refers to a driving method, in which scanning lines, data lines, and current supplying lines are formed on a grid, and driving is carried out via TFT circuits positioned in each of the grids. The active matrix drive is advantageous in gradiation and memory functions since a switching function is allocated to each pixel. The circuit described, for example, in FIG. 5 of JP-A 2004-29327 is employable. In the present invention, of these driving methods, the active matrix drive is preferable from the viewpoint of producing better effects of the present invention.

Further, voltage, applied to make the electrochromic element of the present invention colored via oxidation and colorless via reduction, is preferably in the range of at least 0.1 V-at most 5.0 V, but is more preferably at least 0.5 V-at most 2.0 V in an absolute value.

(Commercial Product Applications)

The display element of the present invention is applied to fields including electronically published books, ID cards, public use, transportation, broadcasting, financial clearance, and distribution and logistics. Specific examples include door keys, student ID cards, employee ID cards, various membership cards, convenience store cards, department store cards, vending machine cards, gas station cards, subway and railroad cards, bus cards, cashing cards, credit cards, highway cards, driver's license cards, hospital consultation cards, electronic medical charts, health insurance cards, basic resident registers, passports, and electronic books.

EXAMPLES

Specifically, the present invention will now be described with reference to the following examples; however, being not limited thereto. Incidentally, "parts" or "%" used in the examples represents "parts by weight" or "% by weight", unless otherwise specified.

Example 1

<Preparation of Display Elements>

(Preparation of Display Element 1: Comparative Example)

A transparent electrode (an electrode 1) was obtained by forming an ITO film of a 5 mm pitch and a 4 mm electrode width onto a 2 cm×2 cm glass substrate of a 1.5 mm thickness via a method known in the art. An electrolyte solution 1 was prepared by dissolving the compound Ex 1 of an amount equivalent to 0.2 mol/l in a propylene carbonate solution containing 1 mol/l of lithium perchlorate, 30% by weight of titanium oxide (primary average particle diameter: 0.34 μm), and 4% by weight of polyethylene glycol (average molecular weight: 500,000).

Subsequently, two electrodes 1 were stacked so that the ITO film surfaces thereof each were faced toward inside via a glass spacer (average particle diameter: 20 µm), followed by inserting the electrolyte solution 1 into the space to prepare Display Element 1.

(Preparation of Display Elements 2-7: Present Invention)

Display Elements 2-7 were prepared in the same manner as in preparation of Display Element 1 except that exemplified compounds 111, 112, 110, 62, 40, and 42 were utilized for each of the display elements instead of the compound Ex 1.

(Preparation of Display Element 8: Comparative Example)

Titanium oxide (primary average particle diameter: 30 nm) was coated onto the electrode 1 used in preparation of Display Element 1 until the titanium oxide volume reached 3 ml/m², and thereafter the resultant product was fired at 450° C. for 30 min to form a bonded transparent conductive microparticle layer. Further, an electrolyte having the transparent conductive microparticle layer was immersed in a solution, prepared by dissolving the compound Ex 2 in ethanol, for three hours so that the compound Ex 2 was deposited onto the transparent conductive microparticles up to a deposition amount of 4 mmol/m², whereby an electrode 2 was prepared.

Further, Display Element 8 was prepared in the same manner as in preparation of Display Element 1 except that one of the electrodes 1 was exchanged for the electrode 2, and an electrolyte solution 2 was utilized, wherein the electrolyte solution 2 contained the same components as the electrolyte solution 1 except for the compound Ex 1.

(Preparation of Display Element 9: Present Invention)

Display Element 9 was prepared in the same manner as in preparation of Display Element 8 except that the compound Ex 2 was exchanged for the example compound 8.

(Preparation of Display Element 10: Comparative Example)

An aqueous solution containing 50% by weight of titanium oxide (primary average particle diameter: 34 µm) was coated onto the transparent conductive microparticle layer of the electrolyte 2 used in preparation of Display Element 8 until the titanium oxide volume reached 6 ml/m², and thereafter the resultant product was dried at 85° C. for an hour to prepare an electrode 3.

Further, Display Element 10 was prepared in the same manner as in preparation of Display Element 8 except that the electrolyte 2 was exchanged for the prepared electrode 3, and titanium oxide was removed from the electrolyte solution 2.

(Preparation of Display Element 11: Present Invention)

Display Element 11 was prepared in the same manner as in preparation of Display Element 10 except that the compound Ex 2 was exchanged for the example compound 42.

(Preparation of Display Element 12: Present Invention)

Sb-doped SnO₂ (primary average particle diameter: 30 nm) was coated onto the electrode 1 used in preparation of Display Element 1 until the volume occupied by this powder reached 3 ml/m², and thereafter the electrolyte 3 was immersed in a solution, prepared by dissolving the compound 3 in acetonitrile, for three hours so that the compound Ex 3 was deposited onto the transparent conductive microparticles in a deposition amount of 4 mmol/m², whereby an electrode 4 was prepared.

Further, Display Element 12 was prepared in the same manner as in preparation of Display Element 11 except that the electrode 1 was exchanged for the electrode 4.

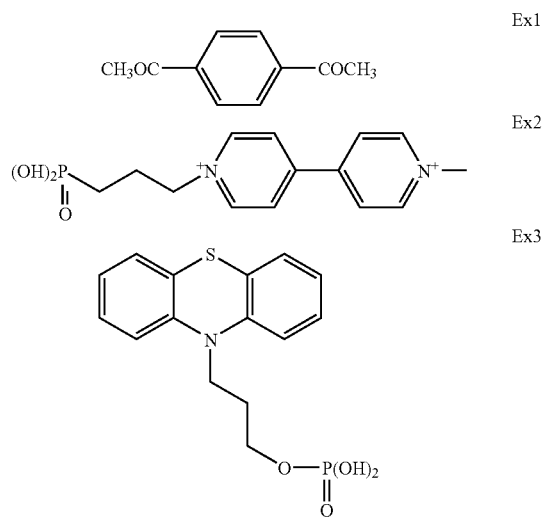

<Evaluation of Display Elements>

(Evaluation of Memory Capability)

By use of spectrophotometer CM-3700d (produced by konica Minolta Sensing, Inc.), there were determined driving conditions (electrode polarity, voltage, and applying time) of the prepared display elements for applying voltage to both of the electrodes, wherein the reflectance of the maximum absorption wavelength during color formation of the display elements was 30%.

Further, each of the display elements was color developed under the conditions, described above, and time required to increase reflectance by 10% in an open circuit state was measured, being used as a measure of memory capability. Longer time, required for the increase, represented superiority in memory capability.

The results obtained above are listed in Table 1.

TABLE 1

| Display Element No. | Electrode Polarity on Coloration | Time for Increasing Reflectance by 10% | Remarks |
|---|---|---|---|
| 1 | Cathode | at most 1 sec | Comparative Example |
| 2 | Anode | 28 min | Present Invention |
| 3 | Anode | 35 min | Present Invention |
| 4 | Anode | 40 min | Present Invention |
| 5 | Anode | 44 min | Present Invention |
| 6 | Anode | 50 min | Present Invention |
| 7 | Anode | 65 min | Present Invention |
| 8 | Cathode | 7 min | Comparative Example |
| 9 | Anode | 120 min | Present Invention |
| 10 | Cathode | 10 min | Comparative Example |
| 11 | Anode | 135 min | Present Invention |
| 12 | Anode | 185 min | Present Invention |

The results listed in Table 1 clearly show that the display element of the present invention is capable of being colored via oxidation, and exhibits excellent memory capability.

Example 2

(Preparation of Full-color Display Element 1)

Display Elements 13 and 14 were prepared in the same manner as in preparation of Display Element 1 described in Example 1 except that the compound Ex 1 was exchanged for the compounds Ex 4 and Ex 5 for each of the display elements.

Further, Full-color Display Element 1 was prepared by laminating Display Element 1 prepared in Example 1 and Display Elements 13 and 14 prepared above. Color formations in yellow, magenta, cyan, blue, green, and red were observed when the full-color display element was driven, exhibiting memory capability of at most 1 sec in an open circuit state.

(Preparation of Full-color Display Element 2)

Display Elements 15, 16, and 17 were prepared in the same manner as in preparation of Display Element 1 described in Example 1 except that the compound Ex 1 was exchanged for the example compounds 107, 108, and 109 for each of the display elements. The maximum absorption wavelengths of thus prepared Display Elements 15, 16, and 17 were 451 nm, 528 nm, and 651 nm, respectively. Full-color Display Element 2 was prepared by laminating these display elements. Color formations in yellow, magenta, cyan, blue, green, and red were observed when the full-color display element was driven, exhibiting memory capability of approximately 55 min-61 min in an open circuit state. Therefore, the results show that the full-color display element of the present invention is capable of displaying full-color images, and exhibits significantly improved memory capability, compared to Comparative Examples.

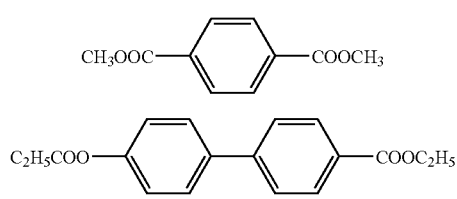

Ex4

Ex5

The invention claimed is:

1. An electrochromic display element comprising a pair of counter electrodes having therebetween an electrochromic compound represented by Formula (1),
    wherein the electrochromic compound becomes colored when being oxidized and becomes colorless when being reduced by a driving operation of the electrodes:

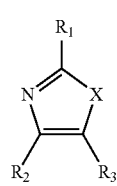

Formula (1)

wherein $R_1$ represents a substituted or unsubstituted aryl group; $R_2$ and $R_3$ each represent a hydrogen atom or a substituent; X represents >N—$R_4$, an oxygen atom or a sulfur atom; and $R_4$ represents a hydrogen atom or a substituent.

2. The electrochromic display element of claim 1, wherein X in Formula (1) is >N—$R_4$.

3. The electrochromic display element of claim 1, wherein $R_1$ in Formula (1) is a substituted or unsubstituted phenyl group.

4. The electrochromic display element of claim 1, wherein $R_1$ in Formula (1) is a substituted or unsubstituted 2-hyroxyphenyl or 4-hyroxyphenyl group.

5. The electrochromic display element of claim 1, wherein $R_2$ or $R_3$ in Formula (1) is a substituted or unsubstituted aryl group.

6. The electrochromic display element of claim 1, wherein $R_2$ and $R_3$ in Formula (1) are a substituted or unsubstituted aryl group.

7. The electrochromic display element of claim 1, wherein the electrochromic compound represented by Formula (1), contains a phosphono group.

8. The electrochromic display element of claim 1, wherein at least one of the counter electrodes comprises a layer formed by bonding of transparent conductive microparticles.

9. The electrochromic display element of claim 1, wherein a porous white scattering layer is provided between the counter electrodes.

10. The electrochromic display element of claim 1, wherein the driving operation for the counter electrodes is an active matrix drive.

11. A full-color electrochromic display element comprising a pair of counter electrodes having therebetween a plurality of electrochromic compounds represented by Formula (1),
    wherein the electrochromic compounds exhibit a different color with each other when being oxidized, and the electrochromic compounds become colorless when being reduced by a driving operation of the electrodes:

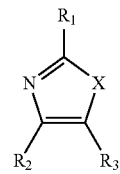

Formula (1)

wherein $R_1$ represents a substituted or unsubstituted aryl group; and $R_2$ and $R_3$ each represent a hydrogen atom or a substituent: X represents >N—$R_4$, an oxygen atom or a sulfur atom; and $R_4$ represents a hydrogen atom or a substituent.

* * * * *